US009661657B2

(12) United States Patent
Yu et al.

(10) Patent No.: US 9,661,657 B2
(45) Date of Patent: May 23, 2017

(54) TCP TRAFFIC ADAPTATION IN WIRELESS SYSTEMS

(71) Applicant: Intel Corporation, Santa Clara, CA (US)

(72) Inventors: Yifan Yu, Haidian District (CN); Xiang Li, Beijing (CN); Guangjie Li, Beijing (CN); Xu Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 14/314,397

(22) Filed: Jun. 25, 2014

(65) Prior Publication Data

US 2015/0146614 A1    May 28, 2015

Related U.S. Application Data

(60) Provisional application No. 61/909,938, filed on Nov. 27, 2013.

(51) Int. Cl.
*H04J 3/16* (2006.01)
*H04W 74/04* (2009.01)
(Continued)

(52) U.S. Cl.
CPC .......... *H04W 74/04* (2013.01); *H04B 7/2621* (2013.01); *H04L 1/0026* (2013.01); *H04L 1/1825* (2013.01); *H04L 5/0007* (2013.01); *H04L 5/0032* (2013.01); *H04L 5/0051* (2013.01); *H04L 5/0073* (2013.01); *H04L 5/14* (2013.01); *H04L 27/2607* (2013.01); *H04L 47/25* (2013.01); *H04L 69/324* (2013.01); *H04W 16/14* (2013.01);
(Continued)

(58) Field of Classification Search
USPC ......................... 370/252, 328, 338, 401, 469
See application file for complete search history.

(56) References Cited

U.S. PATENT DOCUMENTS 7,814,218 B1    10/2010  Knee et al.
8,599,734 B1 *  12/2013  Ram ..................... H04L 1/0002
                                                            370/312
(Continued)

FOREIGN PATENT DOCUMENTS

EP          1959601 A1    8/2008

OTHER PUBLICATIONS

International Search Report and Written Opinion mailed Feb. 5, 2015 from International Application No. PCT/US2014/064422.

*Primary Examiner* — Ricky Ngo
*Assistant Examiner* — Christine Ng
(74) *Attorney, Agent, or Firm* — Schwabe, Williamson & Wyatt, P.C.

(57) ABSTRACT

Embodiments described herein relate generally to efficient transmission of data over a radio network between a user equipment ("UE") and a network node. The UE may adapt packets from TCP to a private protocol and transmit those data packets to the network node. The UE may use ARQ data from link layer circuitry to locally generate TCP ACK data for TCP layer circuitry. At the network node, the private-protocol data packets may be adapted to TCP and transmitted to a remote host over the Internet so that the TCP semantic may be maintained between the UE and the remote host. Other embodiments may be described and/or claimed.

25 Claims, 12 Drawing Sheets

(51) Int. Cl.

| | | |
|---|---|---|
| *H04L 5/00* | (2006.01) | |
| *H04L 5/14* | (2006.01) | |
| *H04W 72/04* | (2009.01) | |
| *H04W 52/02* | (2009.01) | |
| *H04W 76/04* | (2009.01) | |
| *H04L 1/18* | (2006.01) | |
| *H04L 29/08* | (2006.01) | |
| *H04W 40/30* | (2009.01) | |
| *H04L 12/825* | (2013.01) | |
| *H04W 28/02* | (2009.01) | |
| *H04W 16/14* | (2009.01) | |
| *H04B 7/26* | (2006.01) | |
| *H04L 27/26* | (2006.01) | |
| *H04W 72/02* | (2009.01) | |
| *H04L 1/00* | (2006.01) | |
| *H04W 88/06* | (2009.01) | |
| *H04W 88/10* | (2009.01) | |
| *H04W 36/00* | (2009.01) | |
| *H04W 84/12* | (2009.01) | |

(52) U.S. Cl.
CPC ....... *H04W 28/0205* (2013.01); *H04W 40/30* (2013.01); *H04W 52/0216* (2013.01); *H04W 52/0254* (2013.01); *H04W 72/02* (2013.01); *H04W 72/042* (2013.01); *H04W 72/048* (2013.01); *H04W 72/0413* (2013.01); *H04W 72/0446* (2013.01); *H04W 72/0453* (2013.01); *H04W 76/046* (2013.01); *H04W 76/048* (2013.01); *H04W 36/0083* (2013.01); *H04W 84/12* (2013.01); *H04W 88/06* (2013.01); *H04W 88/10* (2013.01); *Y02B 60/50* (2013.01)

(56) References Cited

U.S. PATENT DOCUMENTS

| | | | |
|---|---|---|---|
| 2004/0024894 | A1 | 2/2004 | Osman et al. |
| 2004/0246962 | A1 | 12/2004 | Kopeikin et al. |
| 2006/0002383 | A1* | 1/2006 | Jeong ............... H04L 12/10 370/360 |
| 2006/0098616 | A1* | 5/2006 | Kish ............... H04L 1/1607 370/338 |
| 2007/0274233 | A1* | 11/2007 | Ptashek ............ H04L 67/16 370/254 |
| 2008/0205345 | A1* | 8/2008 | Sachs ............ H04W 36/0011 370/332 |
| 2011/0060974 | A1 | 3/2011 | Viger et al. |
| 2013/0163470 | A1* | 6/2013 | Chidambaram ...... H04L 69/161 370/255 |
| 2013/0250853 | A1* | 9/2013 | Eravelli ............ H04L 69/163 370/328 |
| 2013/0336320 | A1* | 12/2013 | Rangaraman ........ H04L 45/38 370/392 |
| 2014/0269360 | A1* | 9/2014 | Jafarian ........... H04W 52/0209 370/252 |

\* cited by examiner

TCP TRAFFIC ADAPTATION IN WIRELESS SYSTEMS

CROSS REFERENCE TO RELATED APPLICATIONS

This application claims priority under 35 U.S.C. §119(e) to U.S. Provisional Patent Application No. 61/909,938 entitled "ADVANCED WIRELESS COMMUNICATION SYSTEMS AND TECHNIQUES," filed Nov. 27, 2013, the disclosure of which is incorporated herein by reference.

FIELD OF INVENTION

Embodiments of the present invention relate generally to the technical field of data processing, and more particularly, to computer devices operable to communicate data over a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

The Internet protocol suite includes a plurality of protocols used to communicate data over the Internet. The Internet Protocol ("IP") is one of the main protocols used in the Internet protocol suite to route data over the Internet. In concert with the IP, the Transmission Control Protocol ("TCP") may enable communication of data between an application and the IP so that data from the application may be communicated over the Internet. The TCP provides reliable and ordered data communication.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
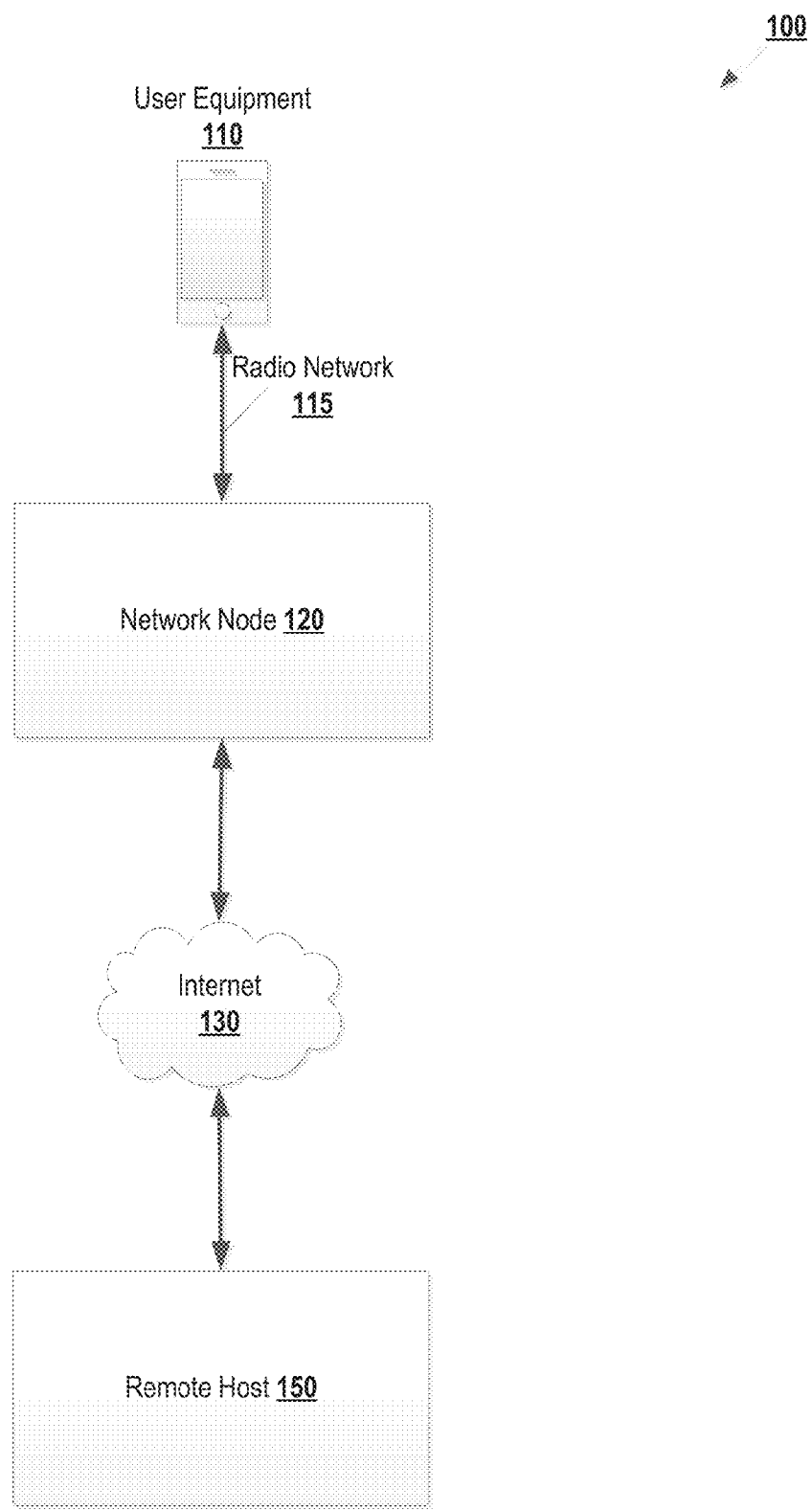
FIG. 1 is a block diagram illustrating an environment in which a user equipment is to communicate data with a remote host according to TCP via a network node, in accordance with various embodiments.

Beginning first with FIG. 1, a block diagram shows an environment 100 in which a user equipment ("UE") 110 is to communicate data with a remote host 150 according to TCP via a network node 120, in accordance with various embodiments. The UE 110 may be any type of mobile computing device equipped with mobile broadband circuitry, such as a netbook, a tablet computer, a handheld computing device, a web-enabled appliance, a gaming device, a mobile phone, a smartphone, an eBook reader, a personal data assistant, or the like. The UE 110 may be any device adapted to communicate over a network (e.g., the radio network 115) according to, for example, one or more $3^{rd}$ Generation Partnership Project ("3GPP") technical specifications.

According to embodiments, the UE 110 may be configured for intersystem communication across the radio network 115. The radio network 115 may comprise a wireless cellular network, such as a Global System for Mobile Communications ("GSM") network, Universal Mobile Telecommunications System ("UTMS"), and/or a code division multiple access ("CDMA") network. A wireless cellular network may adhere to one or more standards, such as Long Term Evolution ("LTE") or LTE-Advanced ("LTE-A"), third Generation ("3G"), fourth Generation ("4G"), fifth Generation ("5G"), Worldwide Interoperability for Microwave Access ("WiMAX") (e.g., mobile WiMAX), or other similar standard.

For communication over the radio network 115, the UE 110 may operate on a cell. In some embodiments, the network node 120 may be adapted to provide this cell and, therefore, the network node 120 may be an access node, such as a Node B or an evolved Node B ("eNB") (macro-, pico-, or femto-eNB). In another embodiment, the network node 120 may be a gateway, such as a serving gateway ("S-GW") or a packet data network gateway ("P-GW"). In embodiments in which the network node 120 is a gateway, the radio network 115 and the network node 120 may be coupled with a plurality of components (not shown) associated with coupling the radio network 115 to a core network in which the network node 120 is provided.

Through the network node 120, the UE 110 may be adapted to communicate with the remote host across the Internet 130. Accordingly, the remote host 150 may be any system adapted to provide a resource (e.g., streaming content, a website, or the like) over the Internet 130. To communicate via the Internet 130, the UE 110 and the remote host 150 may use TCP (e.g., TCP/IP). Therefore, data communicated between the UE 110 and the remote host 150 may be encapsulated in TCP packets. Because TCP is a reliable protocol, a TCP packet may prompt a TCP acknowledgment ("ACK") to confirm successful delivery.

In the illustrated arrangement, TCP packets originating at the UE 110 and intended for the remote host 150 may traverse the radio network 115 to the network node 120. The network node 120 may respond to TCP packets from the UE 110 with TCP ACKs and then transmit those TCP packets over the Internet 130 to the remote host 150. TCP packets originating at the remote host 150 and intended for the UE 110 may be similarly processed and acknowledged by the network node 120. In effect, this communication approach may generate appreciable TCP ACKs between the UE 110 and the network node 120. However, the architectures of the UE 110 and the network node 120 may include reliable data transmission through lower level circuitry that enables the communication of TCP packets.

In embodiments, data transmitted between the UE 110 to the network node 120 over the radio network 115 may be reliably communicated through an Automatic Repeat Request ("ARQ") mechanism implemented at link layer of the UE 110 and the network node 120. For example, Radio Link Control ("RLC") sub-layer of the link layer may transmit an ARQ ACK based on received data when the RLC sub-layer is operating in Acknowledged Mode ("AM"). Alternatively, Media Access Control ("MAC") sub-layer of the link layer may transmit an Hybrid ARQ ("HARQ") ACK when the RLC sub-layer is operating in Unacknowledged Mode ("UM").

It will be understood that a layer/sub-layer circuitry may be dedicated circuitry configured to implement only the operations associated with that particular layer/sub-layer or may be shared circuitry configured to implement operations associated with more than one layer/sub-layer.

Based on the reliable data transmission mechanism provided by the link layer circuitries of the UE 110 and the network node 120, the TCP layer circuitry may be provided TCP ACKs for TCP packets without actually transmitting TCP ACKs over the radio network 115. According to embodiments, TCP packets to be transmitted between UE 110 and the network node 120 may be intercepted before transmission over the radio network 115. The payload data from the TCP packets may be encapsulated according to a private protocol, which may be tunneled in a user datagram protocol ("UDP"), used for communication between the UE 110 and the network node 120. Data from the TCP layer circuitry may then be communicated between the UE 110 and the network 120 based on the private protocol, which may not require its own acknowledgment data to be transmitted over the radio network 115. The UE 110 and the network node 120 may then generate TCP ACKs locally based on ARQ ACKs from the respective link layer circuitries.

At the UE 110, data received according to the private protocol may be locally adapted to TCP packets and provided to TCP layer circuitry so that the TCP layer circuitry may be agnostic to the transmission mechanism implemented at the lower layer circuitry while still maintaining reliable data transmission. Similarly, the network node 120 may adapt data received according to the private protocol to TCP packets before transmission over the Internet 130 to the remote host 150. In this way, TCP ACKs to be transmitted over the radio network 115 may be reduced while the TCP semantic between the UE 110 and the remote host 150 may still be maintained.

Figure 2:
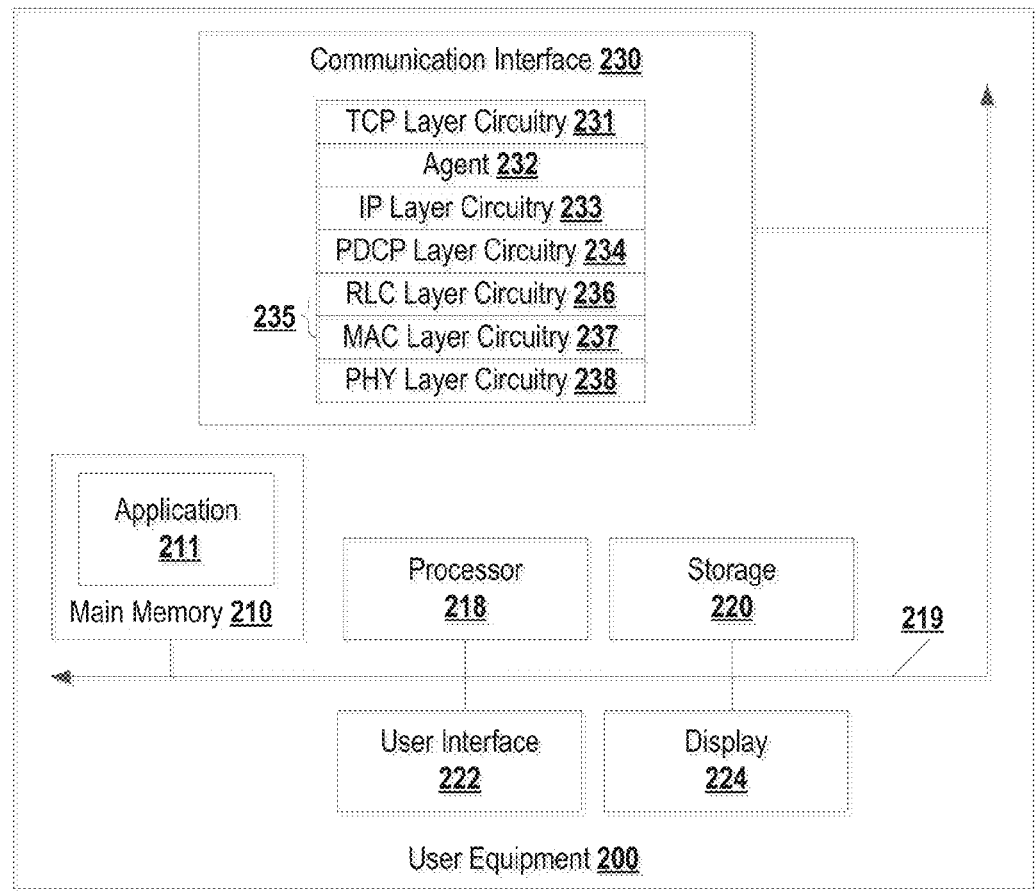
FIG. 2 is a block diagram illustrating a user equipment that is to adapt packets from TCP to a private protocol for transmission over a radio network, in accordance with various embodiments.

With respect to FIG. 2, a block diagram illustrates a UE 200 that is to adapt packets from TCP to a private protocol for transmission over a radio network, in accordance with various embodiments. The UE 200 may be any UE adapted to communicate over a radio network, such as the UE 110 of FIG. 1. The UE 200 may include, but is not limited to, a main memory 210, a processor 218, a storage 220, a user interface 222, a display 224, and a communication interface 230. One or more of these components may be communicatively coupled through a bus 219. The bus 219 may be any subsystem adapted to transfer data within the UE 200. The bus 219 may include a plurality of computer buses as well as additional circuitry adapted to transfer data.

As a means of receiving data, the UE 200 may include a user interface 222 to receive input from a user. The user interface 222 may allow a user to interact with the UE 200 through various means, according to different embodiments—e.g., the user interface 222 may be presented to a user on a display 224 as a graphical user interface or through a command line interface. To receive user input, the user interface 222 may be implemented in hardware, software, or a combination of the two and may include or may be communicatively coupled with one or more hardware devices suitable for user input (e.g., a keyboard, mouse, touch screen, or gesture recognition). Further, the processor 218 may execute some or all of the instructions for the user interface 222.

The processor 218 may be any processor suitable to execute instructions, such as instructions from the main memory 210 and/or instructions from the communication interface 230. Accordingly, the processor 218 may be, for example, a central processing unit ("CPU"), a microprocessor, or another similar processor. In some embodiments, the processor 218 includes a plurality of processors, such as a dedicated processor (e.g., a graphics processing unit), a network processor, or any processor suitable to execute operations of the UE 200.

Coupled with the processor 218 is the main memory 210. The main memory 210 may offer both short-term and long-term storage and may in fact be divided into several units (including a unit located at the processor 218). The main memory 210 may be volatile, such as static random access memory ("SRAM") and/or dynamic random access memory ("DRAM"), and may provide storage (at least temporarily) of computer-readable instructions, data structures, software applications, and other data for the UE 200. Such data may be loaded from the storage 220 and/or the communication interface 230. The main memory 210 may also include cache memory, such as a cache located at the processor 218. The main memory 210 may include, but is not limited to, instructions related to an application 211 that is to be executed by the processor 218. The application 211 may be any application associated with communication of resources over the Internet. For example, the application 211 may be a web browser application, a voice over IP ("VoIP") application, a file-sharing application, a messaging application (e.g., an email application, an instant messaging application, etc.), a social media application, a media application (e.g., an application adapted to stream audio and/or video), or the like.

According to some embodiments, the application 211 may cause the communication interface 230 to communicate data to and from a remote host that is accessible over the Internet. Based on the communication over the Internet, data to be communicated to and from the application 211 may be processed at the IP layer circuitry 233. However, the application 211 may first generate data to be processed at the TCP layer circuitry 231 for reliable communication over the Internet. The TCP layer circuitry 231 may packetize data received from the application 211. The UE 200 may not be directly connected to the Internet, but may rely on a network node to relay TCP packets associated with the application 211 over a radio network.

To reduce TCP traffic over the radio network, an agent 232 may be implemented at the communication interface 230, for example, between the TCP layer circuitry 231 and the IP layer circuitry 233. Although illustrated as within the communication interface 230, the agent 232 may be hardware, software, firmware, and/or a combination of such. For example, the agent 232 may be included in an ASIC or other integrated circuit. In many embodiments, instructions associated with the agent 232 are to be executed by the processor 218 and, therefore, instructions associated with the agent 232 may be stored, at least temporarily, in main memory 210. In various embodiments, the agent 232 may be implemented at least partially in circuitry of the UE 200, such as processing circuitry, processor circuitry, logic circuitry, and the like. Thus, for example, agent circuitry may include circuitry configured to perform various operations described with respect to the agent 232.

In various embodiments, the agent 232 may be adapted to implement a private protocol between the UE 200 and a network node. The private protocol may feature connection-oriented data stream support so that the TCP layer circuitry 231 and the application 211 may operate without any appreciable adaptations from standard configurations—e.g., the TCP semantic between the UE 200 and the remote host to provide resources to the UE 200 may be maintained. In various embodiments, the private protocol may be tunneled in another transport-layer protocol other than TCP, for example, a protocol that does not require reliability, guaranteed delivery, duplication protection, and/or initial connection establishment. In one embodiment, the private protocol may be tunneled in UDP.

For TCP connection establishment, the agent 232 may be adapted to process a TCP synchronize packet ("SYN"), which may be received from the TCP layer circuitry 231. The agent 232 may intercept the TCP SYN and identify a source port value and a destination port value from the TCP SYN. The agent 232 may then apply a hash function to the source port value and the destination port value to generate a hash value. The hash value may then be inserted into a data packet according to the private protocol (e.g., into a header of a private-protocol data packet). The hash value may consume fewer bytes than the source port value and the destination port value such that the data packet itself consumes fewer resources when transmitted to a network node over a radio network—e.g., a source port value may be two bytes and a destination port value may be two bytes, but a hash value computed from the source port value and the destination port value may itself only require two bytes. The agent 232 may include or be communicatively coupled with a lookup table that maps hash values to source and destination port values.

To maintain the TCP semantic between the UE 200 and the remote host, the agent 232 may cause a data packet to be transmitted to a network node that includes the source port value and the destination port value as well as a predetermined value that indicates the data packet is to be used to maintain the TCP semantic (e.g., the network node may be adapted to apply the same hash function to the source port value and destination port value, as well as maintain a lookup table that is to map the hash value to the source port value and the destination port value). Similarly, the agent 232 may be adapted to process a data packet from a network node that includes the source port value and the destination port value as well as a predetermined value that indicates the data packet is to be used to maintain the TCP semantic between the remote host and the UE 200.

In the uplink direction (e.g., from the UE 200 to the remote host), the agent 232 may be adapted to intercept TCP packets generated at the TCP layer circuitry 231. For each TCP packet, the agent 232 may extract payload data and insert that payload data into a data packet according to the private protocol. Additionally, the agent 232 may identify a source port value, a destination port value, and a TCP sequence number ("SN") from the header of the TCP packet.

The agent 232 may then determine a hash value associated with the source port value and the destination port value, such as by accessing a lookup table that maps the source and destination port values to a hash value or by applying a hash function to the source and destination port values. The agent 232 may then provide the data packet to the lower layer circuitry 233-238 to be transmitted to the remote host.

The lower layer circuitry 233-238 may include IP layer circuitry 233 adapted to communicate data based on IP addresses. The IP layer circuitry 233 may be communicatively coupled with Packet Data Convergence Protocol ("PDCP") layer circuitry 234. The PDCP layer circuitry 234 may be associated with, for example, interface control over the radio network and user planes. Further, the PDCP layer circuitry 234 may perform compression and decompression of IP headers. The PDCP layer circuitry 234 may be communicatively coupled with link layer circuitry 235. In various embodiments, the link layer circuitry 235 may be comprised of at least two sub-layers: Radio Link Control ("RLC") layer circuitry 236 and Media Access Control ("MAC") layer circuitry 237. The RLC layer circuitry 236 may provide, for example, concatenation, segmentation, and/or reassembly of data units (e.g., protocol data units and/or service data units), sequential delivery of data units, duplication detection, error recovery, and the like for communication with the network node over the radio network. The MAC layer circuitry 237 may provide addressing and channel access mechanisms, as well as interfacing with the physical ("PHY") layer circuitry 238. The link layer circuitry 235 may be communicatively coupled with the PHY layer circuitry 238, which may include hardware for transmitting data over the radio network. In various embodiments, the PHY layer circuitry 238 may include one or more network adapters and or circuitries for communication of data over one or more radio networks (e.g., a Wi-Fi network, a cellular data network, etc.).

The link layer circuitry 235 may provide ARQ mechanisms—e.g., the RLC layer circuitry 236 may process ARQ data when operating in AM, and the MAC layer circuitry 237 may process HARQ data when the RLC layer circuitry 236 is operating in UM. In various embodiments, the agent 232 may be adapted to use ARQ data from the link layer circuitry 235 to locally generate TCP ACK data for the TCP layer circuitry 231. For each TCP packet having payload data, the agent 232 may identify a TCP SN from the header of the TCP packet. As the agent 232 encapsulates payload data from the TCP packet to the lower layer circuitry 233-238, the agent 232 may map a protocol data unit ("PDU") SN to a TCP SN, such as by updating a lookup table. For example, the agent 232 may interact with the PDCP layer circuitry 234 to obtain a PDU SN associated with the data packet at the link layer circuitry 235, which the agent 232 may then map to the original TCP SN. When the link layer circuitry 235 causes the PHY layer circuitry 238 to transmit the data packet over the radio network, the link layer circuitry 235 may receive ARQ data associated with that data packet. The agent 232 may communicate with the link layer circuitry 235, directly or through PDCP layer circuitry 234, to determine if the ARQ data indicates that the data packet has been successfully transmitted to the network node. The agent 232 may access a lookup table based on a PDU that is indicated by the ARQ data as successfully transmitted to the network node and, based on that ARQ data, locally generate a TCP ACK for the TCP SN corresponding to the PDU SN. The agent 232 may provide this locally generated TCP ACK to the TCP layer circuitry 231 so that the reliable TCP data communication may be maintained and the TCP layer circuitry 231 (and, by association, the application 211) may operate agnostic to the private protocol implemented by the agent 232 to reduce TCP traffic over the radio network.

In the downlink direction (e.g., from the remote host to the UE 200), the agent 232 may be adapted to receive private-protocol data packets from the lower level circuitry 233-238. For each private-protocol data packet, the agent 232 may extract payload data and insert that payload data into a TCP packet according to TCP. Additionally, the agent 232 may identify a hash value from the private-protocol data packet (e.g., from a header of the data packet) and determine a source port value and a destination port value from the hash value, such as by accessing a lookup table. The agent 232 may insert the source and destination port values into a header of the TCP packet and provide the TCP packet to the TCP layer circuitry 231. The TCP layer circuitry 231 may then process the TCP packet from the agent according to the TCP semantic, such as by providing payload data to the application 211.

To close a TCP connection, a private-protocol data packet may be transmitted between the agent 232 and the network node. This private-protocol data packet may serve as a TCP connection termination message ("FIN") for the TCP layer circuitry 231. In various embodiments, this private-protocol data packet may include a hash value that is based on the source port value and the destination port value of the TCP connection, but may have no payload data. In the uplink direction, the agent 232 may be adapted to generate such a private-protocol data packet based on a TCP FIN received from the TCP layer circuitry 231. In the downlink direction, the agent 232 may be adapted to generate a TCP FIN for the TCP layer circuitry 231 based on such a private-protocol data packet.

Figure 3:
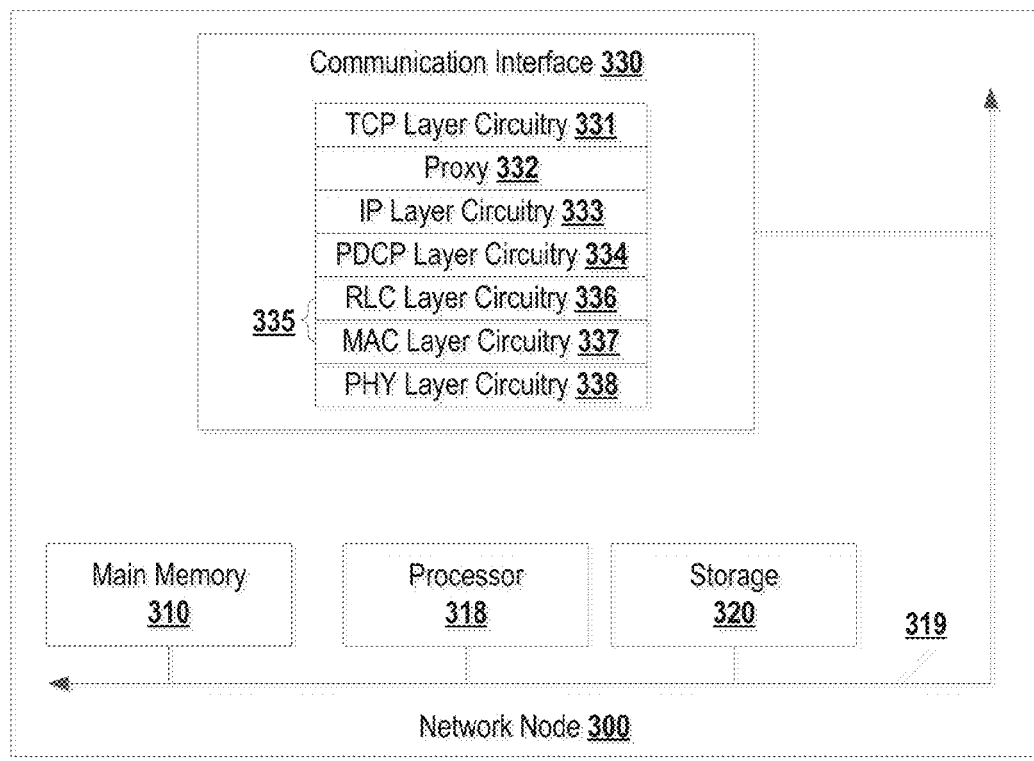
FIG. 3 is a block diagram illustrating a network node that is to adapt data for transmission between a private protocol and TCP, in accordance with various embodiments.

With respect to FIG. 3, a block diagram illustrates a network node 300 that is to adapt data for transmission between a private protocol and TCP, in accordance with various embodiments. The network node 300 may be any server adapted to facilitate communication between a UE and a remote host over the Internet, such as the network node 120 of FIG. 1. The network node 300 may include, but is not limited to, processor 318, storage 320, a main memory 310, and a communication interface 330. These components may be communicatively coupled through a bus 319. The bus 319 may be any subsystem adapted to transfer data within the network node 300. The bus 319 may include a plurality of computer buses as well as additional circuitry adapted to transfer data.

The processor 318 may be any processor suitable to execute instructions, such as instructions from the main memory 310. Accordingly, the processor 318 may be, for example, a central processing unit ("CPU"), a microprocessor, or another similar processor. In some embodiments, the processor 318 includes a plurality of processors, such as a dedicated processor (e.g., a graphics processing unit), a network processor, or any processor suitable to execute operations of the network node 300.

Coupled to the processor 318 is the main memory 310. The main memory 310 may offer both short-term and long-term storage and may in fact be divided into several units (including a unit located at the processor 318). The main memory 310 may also include cache memory, such as a cache located at the processor 318. The main memory 310 may be volatile, such as SRAM and/or DRAM, and may provide storage (at least temporarily) of computer-readable instructions, data structures, software applications, and other data for the network node 300. Such data may be loaded from the storage 320, which may be, for example, one or more hard disk drives, solid state drives, compact disks and drives, digital versatile disks and drives, and the like.

According to embodiments, the network node 300 may be adapted to communicate with a UE over a radio network and with a remote host over the Internet. To facilitate this communication, the network node 300 may include a communication interface 330. The communication interface 330 may allow the network node 300 to relay data between the UE and the remote host.

In connection with an agent implemented at the UE, the network node 300 may include a proxy 332, for example, between the TCP layer circuitry 331 and the IP layer circuitry 333. Although illustrated as within the communication interface 330, the proxy 332 may be hardware, software, firmware, and/or a combination of such. For example, the proxy 332 may be included in an ASIC or other integrated circuit. In many embodiments, instructions associated with the proxy 332 are to be executed by the processor 318 and, therefore, instructions associated with the proxy 332 may be stored, at least temporarily, in main memory 310. In various embodiments, the proxy 332 may be implemented at least partially in circuitry of the network node 300, such as processing circuitry, processor circuitry, logic circuitry, and the like. Thus, for example, proxy circuitry may include circuitry configured to perform various operations described with respect to the proxy 332.

In various embodiments, the proxy 332 may be adapted to implement a private protocol between the network node 300 and the UE. The private protocol may allow TCP layer circuitries of the UE and the remote host to maintain the TCP semantic while reducing TCP traffic over a radio network between the network node 300 and the UE. In various embodiments, the private protocol may be tunneled, for example, in UDP.

For TCP connection establishment, the proxy 332 may be adapted to process a packet that indicates a TCP connection is to be established, which may be received from the UE or the remote host. In one embodiment, the proxy 332 may receive a data packet according to the private protocol that includes a source port value and a destination port value as well as a predetermined value that indicates the data packet is to be used to maintain the TCP semantic between the UE and the remote host. The proxy 332 may be adapted to apply a hash function to the source port value and destination port value, as well as maintain a lookup table that is to map the hash value to the source port value and the destination port value. A TCP SYN may be transmitted to the remote host to establish a TCP connection at that endpoint.

Similarly, the proxy 332 may intercept a TCP SYN (that includes a source port value and a destination port value) from the remote host to establish a TCP connection with the UE. The proxy 332 may then apply a hash function to the source port value and the destination port value from the TCP SYN to generate a hash value. The proxy 332 may generate a data packet according to the private protocol that includes the source port value and the destination port value from the TCP SYN as well as a predetermined value that indicates the data packet is to be used to maintain the TCP semantic (e.g., the UE may be adapted to apply the same hash function to the source port value and destination port value, as well as maintain a lookup table that is to map the hash value to the source port value and the destination port value). Accordingly, respective TCP layer circuitries at the UE and the remote host may operate according to that TCP connection with respective endpoints established at the UE and the remote host.

In the downlink direction (e.g., from the remote host to the UE), the proxy 332 may be adapted to intercept TCP packets received from the remote host at the TCP layer circuitry 331 and to be relayed to the UE. For each TCP packet, the proxy 332 may extract payload data and insert that payload data into a data packet according to the private protocol. Additionally, the proxy 332 may identify a source port value, a destination port value, and/or a TCP SN from the header of the TCP packet. The proxy 332 may then determine a hash value associated with the source port value and the destination port value, such as by accessing a lookup table that maps the source and destination port values to a hash value or by applying a hash function to the source and destination port values. The proxy 332 may then provide the data packet to the lower layer circuitry 333-338 to be transmitted to the remote host.

In the uplink direction (e.g., from the UE to the remote host), the proxy 332 may be adapted to receive private-protocol data packets from the lower level circuitry 333-338. For each private-protocol data packet, the proxy 332 may extract payload data and insert that payload data into a TCP packet according to TCP. Additionally, the proxy 332 may identify a hash value from the private-protocol data packet (e.g., from a header of the data packet) and determine a source port value and a destination port value from the hash value, such as by accessing a lookup table. The proxy 332 may insert the source and destination port values into a header of the TCP packet and provide the TCP packet to the TCP layer circuitry 331. The TCP layer circuitry 331 may then process the TCP packet from the agent according to the TCP semantic, such as by providing the TCP packet to the lower layer circuitry 333-338 for transmission to the remote host.

The lower layer circuitry 333-338 may include IP layer circuitry 333 adapted to communicate data based on IP addresses. For communication with the UE over a radio network, the IP layer circuitry 333 may be communicatively coupled with PDCP layer circuitry 334. The PDCP layer circuitry 334 may perform, among other operations, compression and decompression of IP headers. The PDCP layer circuitry 334 may be communicatively coupled with link layer circuitry 335. In various embodiments, the link layer circuitry 335 may be comprised of at least two sub-layers: RLC layer circuitry 336 and MAC layer circuitry 337. The RLC layer circuitry 336 may provide, for example, concatenation, segmentation, and/or reassembly of data units (e.g., protocol data units and/or service data units), sequential delivery of data units, duplication detection, error recovery, and the like for communication with the UE over the radio network. The MAC layer circuitry 337 may provide addressing and channel access mechanisms, as well as interfacing with the PHY layer circuitry 338. The link layer circuitry 335 may be communicatively coupled with the PHY layer circuitry 338, which may include hardware circuitries for transmitting data over the radio network UE as well as over the Internet to the remote host. In various embodiments, the PHY layer circuitry 338 may include one or more network adapters, modems, and or circuitries for communication of data over one or more networks.

With respect to communication with the UE, the link layer circuitry 335 may implement ARQ mechanisms—e.g., the RLC layer circuitry 336 may transmit ARQ data and/or the MAC layer circuitry 337 may transmit HARQ data. For each private-protocol data packet received at the link layer circuitry 335, the link layer circuitry 335 may transmit an ARQ ACK and/or an HARQ ACK to the UE, which the UE may use to locally generate a TCP ACK.

As the proxy 332 adapts TCP packets from the TCP layer circuitry 331, the proxy 332 may be adapted to use ARQ data from the link layer circuitry 335 to locally generate TCP ACK data for the TCP layer circuitry 331. For each TCP packet having payload data, the proxy 332 may identify a TCP SN from the header of the TCP packet. As the proxy 332 encapsulates payload data from the TCP packet to the lower layer circuitry 333-338, the proxy 332 may map a PDU SN to a TCP SN, such as by updating a lookup table. For example, the proxy 332 may interact with the PDCP layer circuitry 334 to obtain a PDU SN associated with the data packet at the link layer circuitry 335, which the proxy 332 may then map to the original TCP SN. When the link layer circuitry 335 causes the PHY layer circuitry 338 to transmit the data packet to the UE over the radio network, the link layer circuitry 335 may receive ARQ data associated with that data packet. The proxy 332 may communicate with the link layer circuitry 335, directly or through PDCP layer circuitry 334, to determine if the ARQ data indicates that the data packet has been successfully transmitted to the UE. The proxy 332 may access a lookup table based on a PDU that is indicated by the ARQ data as successfully transmitted to the UE and, based on that ARQ data, locally generate a TCP ACK for the TCP SN corresponding to the PDU SN. The proxy 332 may provide this locally generated TCP ACK to the TCP layer circuitry 331 so that the reliable TCP data communication may be maintained and the TCP layer circuitry 331 may operate agnostic to the private protocol implemented by the proxy 332 to reduce TCP traffic over the radio network.

With respect to communication with the remote host, the proxy 332 may implement or be communicatively coupled with a cache, such as a cache at main memory 310. The proxy 332 may cache payload data from data packets from the UE. This caching mechanism may allow the proxy 332 to retransmit data, received from the UE, to the remote host when a TCP ACK is not received from the remote host without requiring the UE to retransmit data that was not acknowledged as received by the remote host.

To close a TCP connection, a private-protocol data packet may be transmitted between the proxy 332 and the UE. This private-protocol data packet may serve as a TCP FIN for the TCP layer circuitry 331. In various embodiments, this private-protocol data packet may include a hash value that is based on the source port value and the destination port value of the TCP connection, but may have no payload data. In the downlink direction, the proxy 332 may be adapted to generate a private-protocol data packet based on a TCP FIN received from the TCP layer circuitry 331 (e.g., a TCP FIN originating at the remote host). In the uplink direction, the proxy 332 may be adapted to generate a TCP FIN for the TCP layer circuitry 331 (e.g., to be transmitted to the remote host) based on such a private-protocol data packet received from the UE.

According to various embodiments, the network node 300 may be adapted to provide a wireless cell on which a UE may operate. However, this cell may have limited coverage and, therefore, the network node 300 may be adapted to hand the UE over to another network node adapted to provide another cell to the UE. In such embodiments, the proxy 332 may be adapted to transmit a mapping table (e.g., a mapping table that is to map a hash value to a source port value and a destination port value) to the other network node based on the handover of the UE to the other network node.

Figure 4:
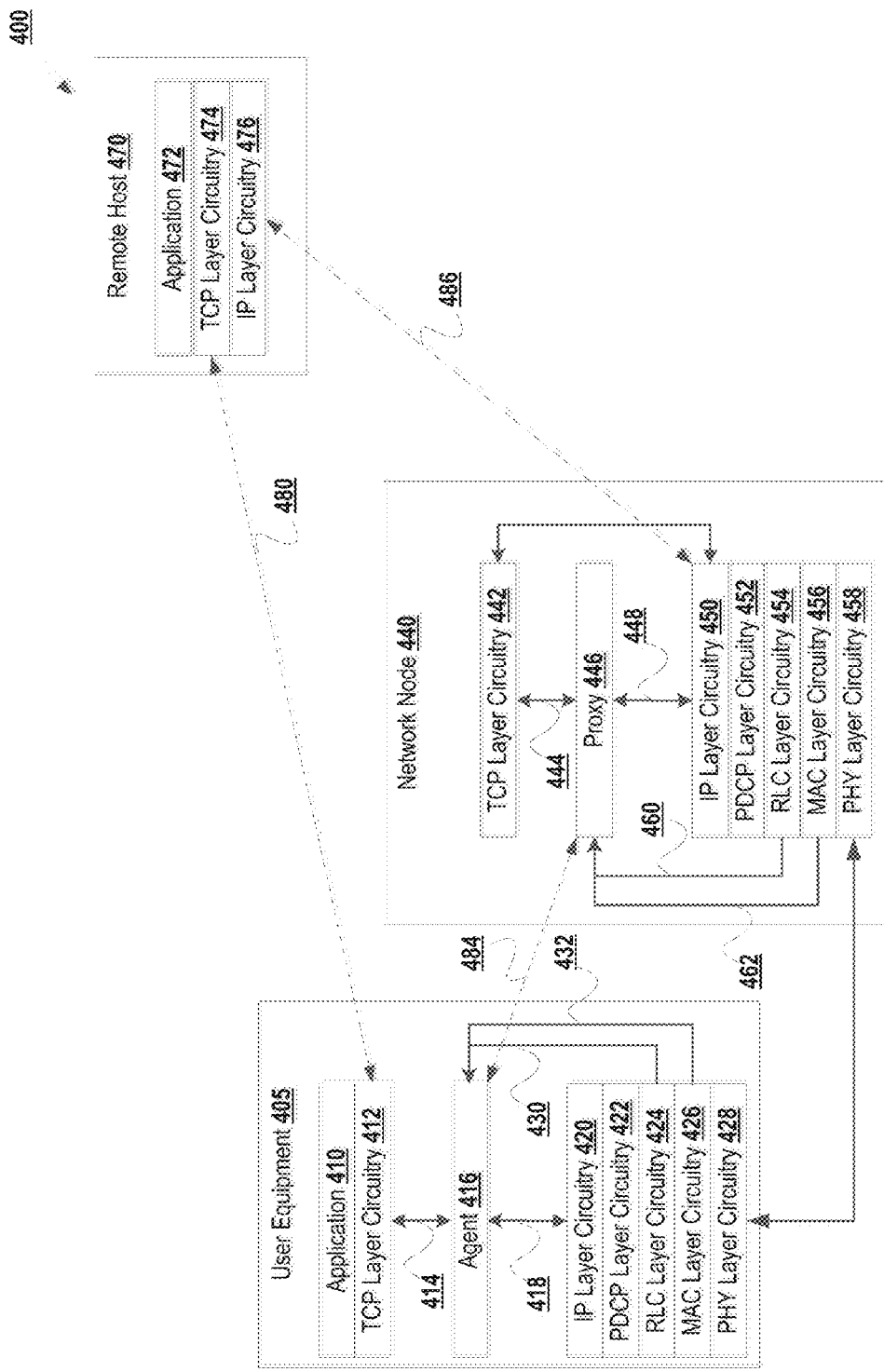
FIG. 4 is a block diagram illustrating a system having reduced TCP traffic between a user equipment and a network node while maintaining a TCP semantic between the user equipment and a remote host, in accordance with various embodiments.

In reference to FIG. 4, a block diagram shows a system 400 having reduced TCP traffic between a UE 405 and a network node 440 while maintaining a TCP semantic 480 between the UE 405 and a remote host 470. FIG. 4 may illustrate an embodiment of the environment 100 shown in FIG. 1. Accordingly, the UE 405 may an embodiment of the UE 110, the network node 440 may be an embodiment of the network node 120, and/or the remote host 470 may be an embodiment of the remote host 150 of FIG. 1.

In embodiments, an application 410 executed by the UE 405 may wish to reliably communicate with an application 472 executed by the remote host 470. The application 472 at the remote host 470 may be accessible to the application 410 at the UE 405 over the Internet and, therefore, the UE 405 and the remote host 470 may use TCP/IP. Accordingly, the respective TCP layer circuitries 412, 474 at the UE 405 and the remote host 470 may communicate according to the TCP semantic 480.

Data to be communicated between the UE 405 and the remote host 470 may traverse through the network node 440. The arrangement, however, may cause an appreciable volume of TCP ACK data to be communicated between the UE 405 and the network node 440 that may be effectively repetitive of the ARQ and/or HARQ mechanisms implemented by the RLC layer circuitries 424, 454 and MAC layer circuitries 426, 456, respectively. That is, because the ARQ and/or HARQ mechanisms already provide reliable data communication at the link layer circuitries 424, 426, 454, 456, the TCP ACK mechanisms of the TCP layer circuitries 412, 442 may be unnecessary. Therefore, the ARQ and/or HARQ mechanisms may be used at the UE 405 and the network node 440 to locally generate TCP ACK data without requiring transmission of TCP ACK data over the air between the UE 405 and the network node 440.

In the uplink direction (e.g., data from the UE 405 to the remote host 470), the application 410 may provide data to the TCP layer circuitry 412. The TCP layer circuitry 412 may be adapted to generate a plurality of TCP packets 414 based on this data. However, the agent 416 may be adapted to intercept the TCP packets 414 as they are provided to the lower level circuitries 420-428. The agent 416 may be adapted to communicate with a proxy 446 at the network node 440 according to a private protocol 484.

In various embodiments, the private protocol 484 may be a system of digital rules for exchanging data. The agent 416 and the proxy 446 may be adapted to receive, process, and/or interpret data received according to this system of digital rules. Other layer circuitries 412, 420-428, 442, 450-458 may not be adapted to communicate data according to the private protocol 484.

According to various embodiments, the agent 416 may encapsulate payload data from the plurality of TCP packets 414 into data packets according to the private protocol 484. To identify the source and destination endpoints associated with each TCP packet, the agent 416 may be adapted to identify a source port value and destination port value from the TCP packet. The agent may apply a hash function to the source and destination port values to generate a hash value and store the hash value in a table that associates the hash value with the source and destination port values.

For the TCP layer circuitry 412 to remain agnostic to the private protocol 484, the agent 416 may identify a TCP SN from each header of each TCP packet 414 provided thereto. As the agent 416 provides the private-protocol data packets 418 to the lower layer circuitries 420-428, the agent 416 may associate each TCP SN with a PDU from the lower level circuitries 420-428. At the RLC layer circuitry 424, each data packet may be associated with an RLC PDU. Similarly, each data packet may be associated with an MAC PDU at the MAC layer circuitry 426. The agent 416 may be adapted to receive the RLC PDU and/or MAC PDU and associate the TCP SN with at least one of the RLC PDU or the MAC PDU (e.g., the agent 416 may store the TCP SN and the PDU in a table that is to map TCP SNs to PDUs).

The link layer circuitries 424, 426 may provide the private-protocol data packets to the PHY layer circuitry 428, which may then transmit the private-protocol data packets to the network node 440. From the PHY layer circuitry 458 of the network node 440, the link layer circuitries 454, 456 may receive those private-protocol data packets. As data packets are received at the link layer circuitries 454, 456, the link layer circuitries 454, 456 may cause ARQ and/or HARQ ACK data to be transmitted to the UE 405. As the link layer circuitries 424, 426 of the UE 405 receive ARQ and/or HARQ ACK data, the agent 416 may be adapted to determine from the ARQ and/or HARQ ACK data whether each data packet has been successfully transmitted to the network node 440.

In an embodiment in which the RLC layer circuitry 424 is operating in AM mode, the RLC layer circuitry 424 may provide ARQ data 430 to the agent 416. From the ARQ data 430, the agent 416 may identify an acknowledgment that a data packet corresponding to an RLC PDU has been successfully transmitted to the network node 440. In an embodiment in which the RLC layer circuitry 424 is operating in UM mode, the MAC layer circuitry 426 may provide HARQ data 432 to the agent 416. From the HARQ data 432, the agent 416 may identify an acknowledgment that a data packet corresponding to an MAC PDU has been successfully transmitted to the network node 440. The agent 416 may then identify a TCP SN based on the PDU, such as by accessing a lookup table with the PDU, and locally generate a TCP ACK for the identified TCP SN. The agent 416 may provide the locally generated TCP ACK to the TCP layer circuitry 412 so that the TCP layer circuitry 412 may provide reliable data communication for the application 410.

At the network node 440, the private-protocol data packets 448 may reach the proxy 446 from the lower level circuitries 450-458. For each private-protocol data packet, the proxy 446 may extract payload data and insert that payload data into a TCP packet to maintain the TCP semantic 480. The proxy 446 may identify a hash value from the private-protocol data packet (e.g., from a header of the data packet) and determine a source port value and a destination port value from the hash value, such as by accessing a lookup table. The proxy 446 may insert the source and destination port values into a header of the TCP packet and provide the TCP packet to the TCP layer circuitry 442. The TCP layer circuitry 442 may then provide the TCP packet to the IP layer circuitry 450. The IP layer circuitry 450 may cause the TCP packet to be transported over the Internet to the IP layer circuitry 476 of the remote host according to IP 486.

In the downlink direction (e.g., data from the remote host 470 to the UE 405), an application 472 may provide data to TCP layer circuitry 474 to be communicated to the UE 405 according to the TCP semantic 480. The TCP layer circuitry 474 may packetize this application data and provide the TCP packets to the IP layer circuitry 476, which may transmit the TCP packets to the network node 440 according to IP 486. At the network node 440, the TCP packets may reach the TCP layer circuitry 442, and the proxy 446 may intercept these TCP packets 444 that are to be transmitted to the UE 405. For each TCP packet, the proxy 446 may extract payload data and insert that payload data into a data packet according to the private protocol 484. Additionally, the proxy 446 may identify a source port value, a destination port value, and/or a TCP SN from the header of the TCP packet. The proxy 446 may then determine a hash value associated with the source port value and the destination port value, such as by accessing a lookup table that associates the source and destination port values to a hash value or by applying a hash function to the source and destination port values. The proxy 446 may then provide the data packet, as part of a plurality of private-protocol data packets 448, to the lower layer circuitry 450-458 to be transmitted to the UE 405.

In adapting the plurality of TCP packets 444 to the plurality of data packets 448, the proxy 446 may identify a TCP SN from each header of each TCP packet 444 provided thereto. As the proxy 446 provides the private-protocol data packets 448 to the lower layer circuitries 450-458, the proxy 446 may associate each TCP SN with a PDU from the lower level circuitries 450-458. At the RLC layer circuitry 454, each data packet may be associated with an RLC PDU. Similarly, each data packet may be associated with an MAC PDU at the MAC layer circuitry 456. The proxy 446 may be adapted to receive the RLC PDU and/or MAC PDU and associate the TCP SN with at least one of the RLC PDU or the MAC PDU (e.g., the proxy 446 may store the TCP SN and the PDU in a table that is to map TCP SNs to PDUs).

The link layer circuitries 454, 456 may provide the private-protocol data packets to the PHY layer circuitry 458, which may then transmit the private-protocol data packets to the UE 405. From the PHY layer circuitry 428 of the UE 405, the link layer circuitries 424, 426 may receive those private-protocol data packets. As data packets are received at the link layer circuitries 424, 426, the link layer circuitries 424, 426 may cause ARQ and/or HARQ ACK data to be transmitted to the network node 440. As the link layer circuitries 454, 456 of the network node 440 receive ARQ and/or HARQ ACK data, the proxy 446 may be adapted to determine from the ARQ and/or HARQ ACK data whether each data packet has been successfully transmitted to the UE 405.

In an embodiment in which the RLC layer circuitry 454 is operating in AM mode, the RLC layer circuitry 454 may provide ARQ data 460 to the proxy 446. From the ARQ data 460, the proxy 446 may identify an acknowledgment that a data packet corresponding to an RLC PDU has been successfully transmitted to the UE 405. In an embodiment in which the RLC layer circuitry 454 is operating in UM mode, the MAC layer circuitry 456 may provide HARQ data 462 to the proxy 446. From the HARQ data 462, the proxy 446 may identify an acknowledgment that a data packet corresponding to an MAC PDU has been successfully transmitted to the UE 405. The proxy 446 may then identify a TCP SN based on the PDU, such as by accessing a lookup table with the PDU, and locally generate a TCP ACK for the identified TCP SN. The proxy 446 may provide the locally generated TCP ACK to the TCP layer circuitry 442 so that the TCP layer circuitry 442 may provide reliable data communication.

At the UE 405, the agent 416 may be adapted to receive private-protocol data packets from the lower level circuitries 420-428. For each private-protocol data packet 418, the agent 416 may extract payload data and insert that payload data into a TCP packet according to TCP. Additionally, the agent 416 may identify a hash value from the private-protocol data packet (e.g., from a header of the data packet) and determine a source port value and a destination port value from the hash value, such as by accessing a lookup table. The agent 416 may insert the source and destination port values into a header of the TCP packet and provide the TCP packet, included in a plurality of TCP packets 414, to the TCP layer circuitry 412. The TCP layer circuitry 412 may then process the TCP packet according to the TCP semantic 480 maintained between the TCP layer circuitry 412 of the UE 405 and the TCP layer circuitry 474 of the remote host 470.

Figure 5:
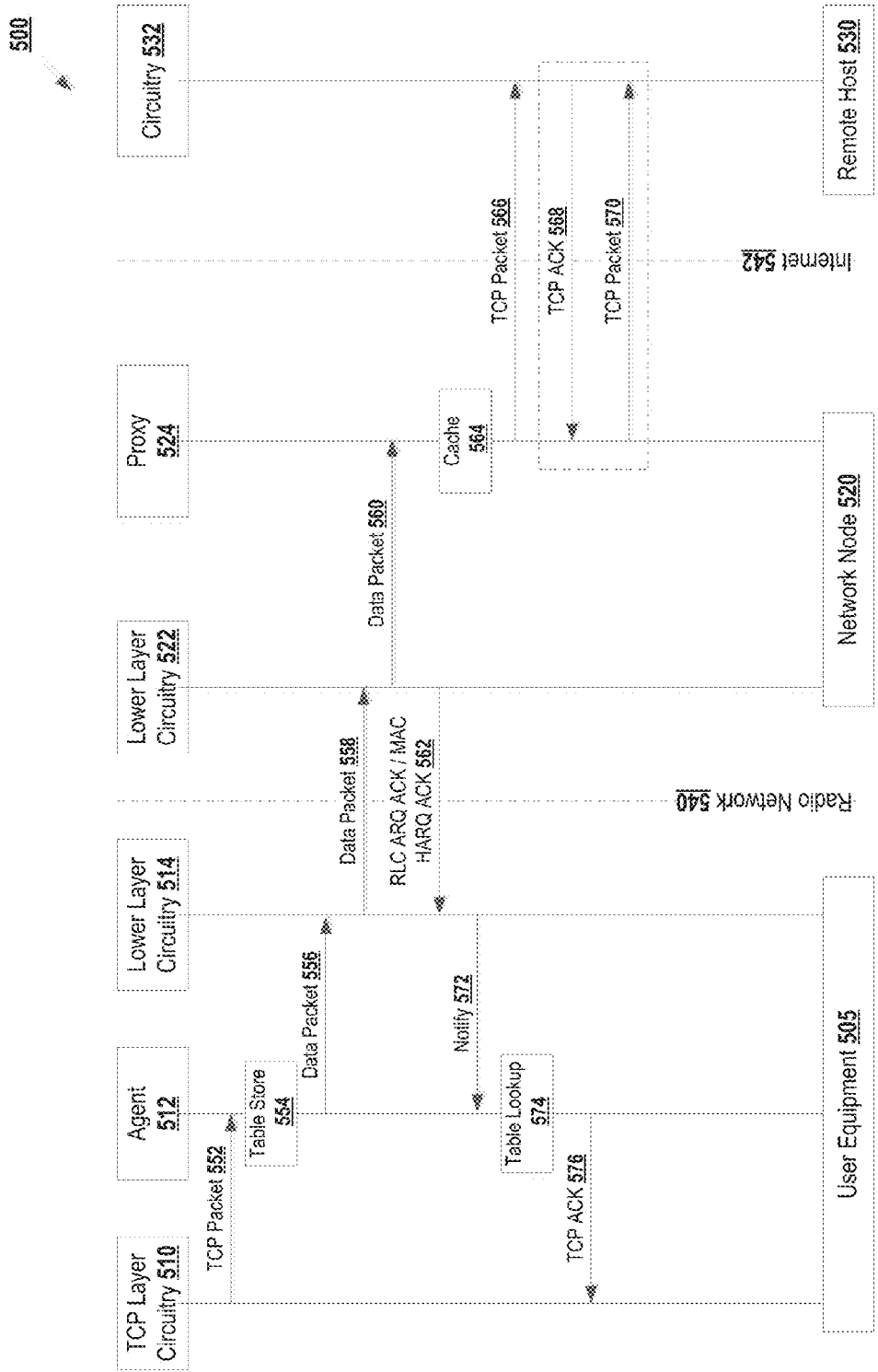
FIG. 5 is a sequence diagram illustrating a sequence of uplink data transmission between a user equipment and a remote host according to a TCP semantic, in accordance with various embodiments.

With respect to FIG. 5, a sequence diagram illustrates a sequence 500 of uplink data transmission between a UE 505 and a remote host 530 according to a TCP semantic, according to various embodiments. FIG. 5 may illustrate an embodiment of a sequence of data communication in the environment 100 shown in FIG. 1. Accordingly, the UE 505 may be an embodiment of the UE 110, the network node 520 may be an embodiment of the network node 120, and/or the remote host 530 may be an embodiment of the remote host 150 of FIG. 1.

Initially, TCP layer circuitry 510 of the UE 505 may provide a TCP packet to an agent 512 that is to be communicated to the remote host 530 (operation 552). The agent 512 may extract a source port value, a destination port value, and a TCP SN from a header of the TCP packet. The agent 512 may store the TCP SN in a table that associates the TCP SN with a PDU SN from the lower layer circuitry 514 (operation 554). The agent may adapt the TCP packet to a private-protocol data packet and provide the private-protocol data packet to the lower layer circuitry 514 (operation 556). The lower layer circuitry 514 of the UE 505 may transmit the data packet over a radio network 540 to the lower layer circuitry 522 of the network node 520 (operation 558).

The lower layer circuitry 522 of the network node 520 may provide the private-protocol data packet to a proxy 524 (operation 560). To acknowledge that the private-protocol data packet has been successfully received at the network node 520, the lower layer circuitry 522 may transmit an ARQ ACK to the UE 505 (operation 562). In various embodiments, the ARQ ACK may be an ARQ ACK from RLC sub-layer circuitry of the lower layer circuitry 522 or an HARQ ACK from MAC sub-layer circuitry of the lower layer circuitry 522. The proxy 524 may adapt the private-protocol data packet to a TCP packet and cache the payload data from the private-protocol data packet (operation 564). The proxy 524 may then cause the TCP packet to be transmitted over the Internet 542 to circuitry 532 of the remote host 530 (operation 566). Based on the TCP packet, circuitry 532 of the remote host 530 may cause a TCP ACK to be transmitted over the Internet 542 to the network node 520 (operation 568). In the event that a TCP ACK is not received for the transmitted TCP packet and/or the TCP ACK indicates an error, the proxy 524 may cause the payload data from the private-protocol data packet to be retransmitted (operation 570).

At the UE 505, the ARQ ACK for the data packet is received at the lower layer circuitry 514 (e.g., an ARQ ACK at RLC sub-layer circuitry or an HARQ ACK at MAC sub-layer circuitry). The lower layer circuitry 514 may notify the agent 512 that the private-protocol data packet has been indicated as received at the network node 520 based on the ARQ ACK (operation 572). The notification may include a PDU SN associated with the lower layer circuitry 514, and the agent 512 may use the PDU SN to determine a corresponding TCP SN based on the table in which the TCP SN was associated with the PDU SN (operation 574). The agent 512 may then locally generate a TCP ACK that includes the TCP SN determined from the table lookup and provide that TCP ACK to the TCP layer circuitry 510 (operation 576).

Through this approach, traffic over the radio network 540 may be reduced, for example, through reduction of transmission of TCP ACK data.

Figure 6:
FIG. 6 is a block diagram illustrating a TCP header that may be implemented in a TCP semantic, in accordance with various embodiments.

Turning to FIG. 6, a block diagram illustrates a TCP header 600 that may be implemented in a TCP semantic, in accordance with various embodiments. The TCP header 600 may be locally generated and communicated between circuitry of a computing device, such as the UE 110 and/or the network node 120 of FIG. 1. Additionally, the TCP header 600 may be transmitted over the Internet between a network node and a remote host, such as the network node 120 and the remote host 150 of FIG. 1.

According to embodiments, the TCP header includes a source port field 605 and a destination port field 610. The source port field 605 and the destination port field 610 may be respective communication endpoints at a UE and/or a remote host, depending upon whether the TCP header is to be transmitted in the uplink or downlink direction. The SN field 615 may include the SN of the first data octet in a TCP segment associated with the TCP header 600 (except when a SYN indication is present). If a SYN indication is present in the SN field 615, then the SN may be an initial SN. The ACK field 620 may include the value of a next SN that an endpoint (e.g., a UE or remote host) is expecting for acknowledgment that a TCP packet has been successfully received. The checksum field 625 may include a value computed for error detection.

For transmission over a radio network between a UE and a network node, TCP acknowledgment and congestion control mechanisms can be implemented through ARQ mechanisms, and a value from TCP SN field 615 can be mapped to a PDU SN from RLC and/or MAC circuitry. The private protocol described herein may be used instead of TCP. Further, some fields of the TCP header 600 may be eliminated and/or locally implemented so that no changes are required to the TCP circuitry. For example, a value for the checksum field 625 may be locally calculated.

Figure 7:
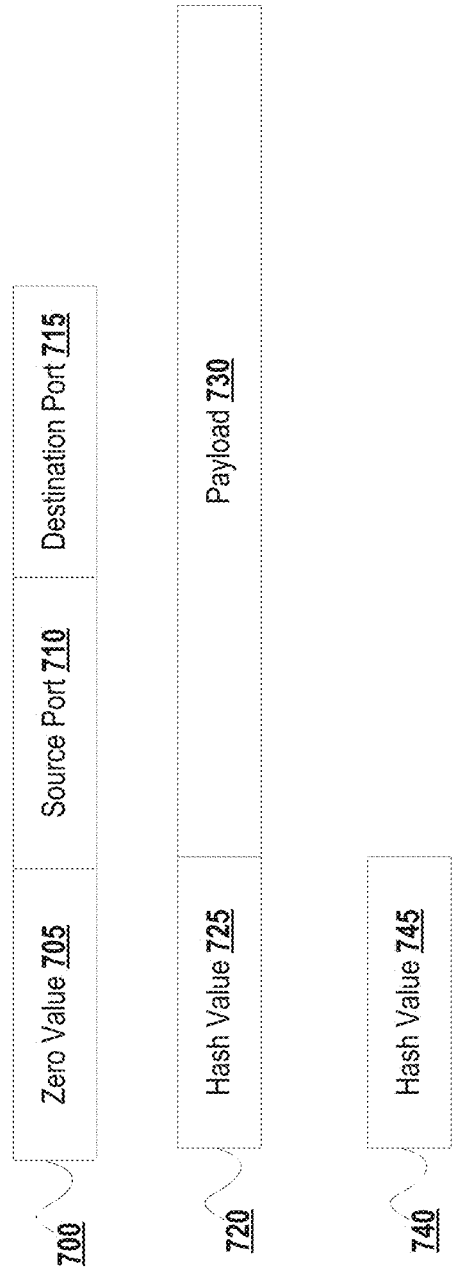
FIG. 7 is a block diagram illustrating a plurality of data packets that may be used to implement a private protocol between a user equipment and a network node, in accordance with various embodiments.

With reference to FIG. 7, a block diagram illustrates a plurality of data packets 700, 720, 740 that may be used to implement a private protocol between a UE and a network node, in accordance with various embodiments. The plurality of data packets 700, 720, 740 may be generated and/or communicated between computing devices, such as between the UE 110 and the network node 120 over the radio network 115 of FIG. 1.

For TCP connection establishment, a TCP SYN may be used. According to embodiments of a private protocol, the TCP SYN may be implemented in the private protocol using a data packet 700. The private-protocol data packet 700 may include an indication for connection establishment 705—e.g., a connection establishment indication 705 may be a zero value that is two bytes. For local establishment of a TCP connection at TCP layer circuitry, the private-protocol data packet 700 may include a source port value 710 and a destination port value 715. An agent and/or a proxy may then apply a hash function to the source port value 710 and the destination port value 715 to generate a hash value for implementation of the private protocol. The agent and/or proxy may include or be communicatively coupled with respective lookup tables that map hash values to source and destination port values. The hash value may consume fewer bytes than the source port value 710 and the destination port value 715 such that a second data packet 720 having payload data consumes fewer resources when transmitted to a network node over a radio network—e.g., a source port value 710 may be two bytes and a destination port value 715 may be two bytes, but a hash value computed from the source port value 710 and the destination port value 715 may itself only require two bytes.

The hash value 725 may then be inserted into a data packet according to the private protocol, as shown with the second private-protocol data packet 720. The second private-protocol data packet 720 may include payload data 730. The payload data 730 may be locally extracted from a TCP packet. The second private-protocol data packet 720 may be communicated between a UE and a network node to reduce TCP traffic over a radio network.

To close a TCP connection, a private-protocol data packet 740 include the hash value 745 that corresponds to the source port value 710 and destination port value 715. However, this private-protocol data packet 740 may have no payload data, and the absence of payload data may indicate that this private-protocol data packet is to implement a TCP FIN for TCP layer circuitry.

Figure 8:
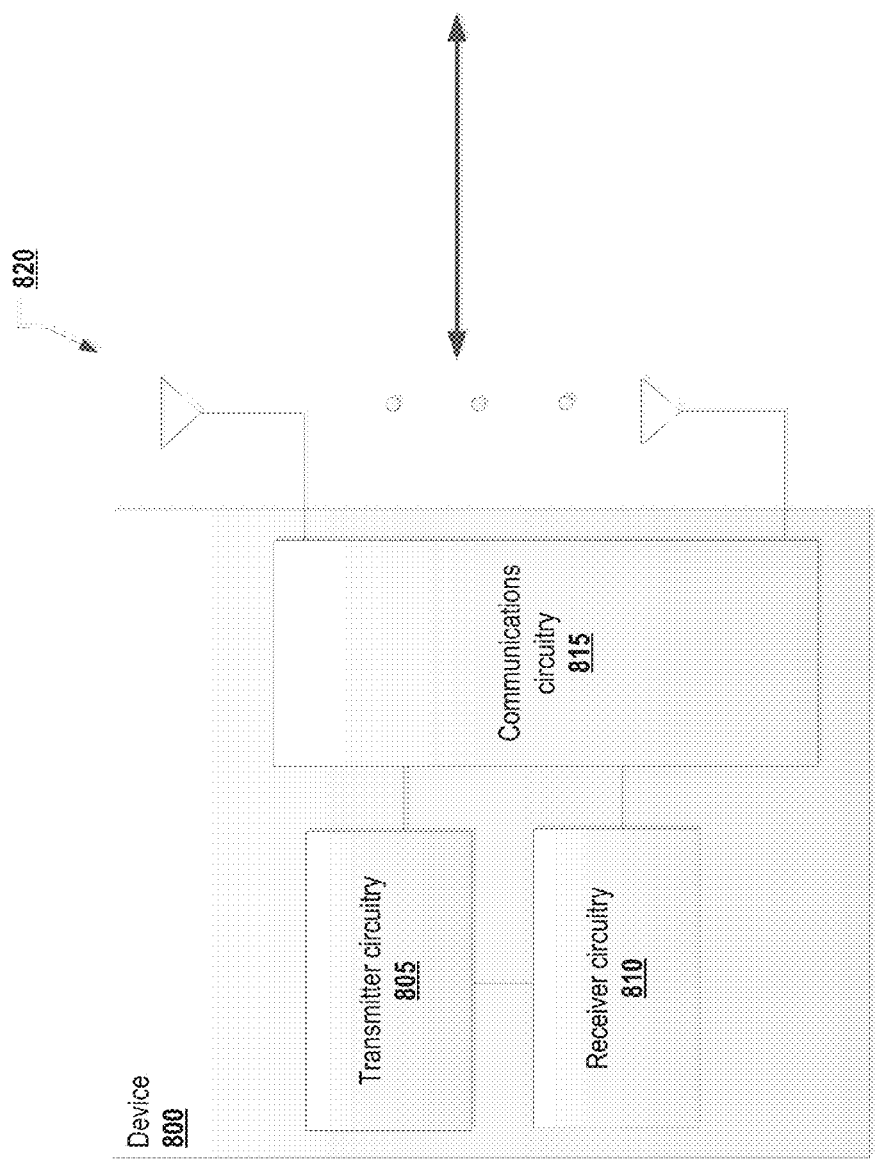
FIG. 8 is a block diagram illustrating a device to receive and transmit data packets over a radio network, in accordance with various embodiments.

With respect to FIG. 8, a block diagram illustrates a device 800 for wireless reception and transmission of data between computing systems, in accordance with various embodiments. The device 800 may be or may be included in a UE or network node, such as the UE 110 and/or the network node 120 of FIG. 1. In various embodiments, the circuitry of the device may be integrated with and/or communicatively coupled with a communication interface, such as a communication interface 230 of a UE 200 shown in FIG. 2 and/or a communication interface 330 of a network node 300 shown in FIG. 3. The device 800 may include, but is not limited to, transmitter circuitry 805, receiver circuitry 810, communications circuitry 815, and/or one or more antennas 820 coupled with each at least as shown.

Briefly, the communications circuitry 815 may be coupled with the antennas 820 to facilitate over-the-air communication of signals to/from the device 800. Operations of the communications circuitry 815 may include, but are not limited to, filtering, amplifying, storing, modulating, demodulating, transforming, etc.

The transmitter circuitry 805 may be coupled with the communications circuitry 815 and may be configured to provide signals to the communications circuitry 815 for transmission by the antennas 820. In various embodiments, the transmitter circuitry 805 may be configured to provide various signal processing operations on the signal to provide the signal to the communications circuitry 815 with appropriate characteristics. In some embodiments, the transmitter circuitry 805 may be configured to wirelessly transmit one or more data packets.

The transmitter circuitry 805 may be configured to receive signals for transmission by the communications circuitry 815. In some embodiments, the transmitter circuitry 805 may be adapted to generate signals. Further, the transmitter circuitry 805 may be adapted to scramble, multiplex, and/or modulate various signals prior to transmission by the communications circuitry 815.

The receiver circuitry 810 may be coupled with the communications circuitry 815 and may be configured to receive signals for and/or from the communications circuitry 815, such as signals detected by one or more antennas 820. In some embodiments, the receiver circuitry 810 may be adapted to generate, adapt, or otherwise change signals. Further, the receiver circuitry 810 may be adapted to send received signals to another module or component (not shown), communicatively coupled with the device 800 so that data received from outside a device having the device 800 may utilize that data at the device. In some embodiments, the receiver circuitry 810 may receive one or more data packets.

Some or all of the communications circuitry 815, transmitter circuitry 805, and/or receiver circuitry 810 may be included in, for example, a communication chip and/or communicatively coupled with a printed circuit board.

Figure 9:
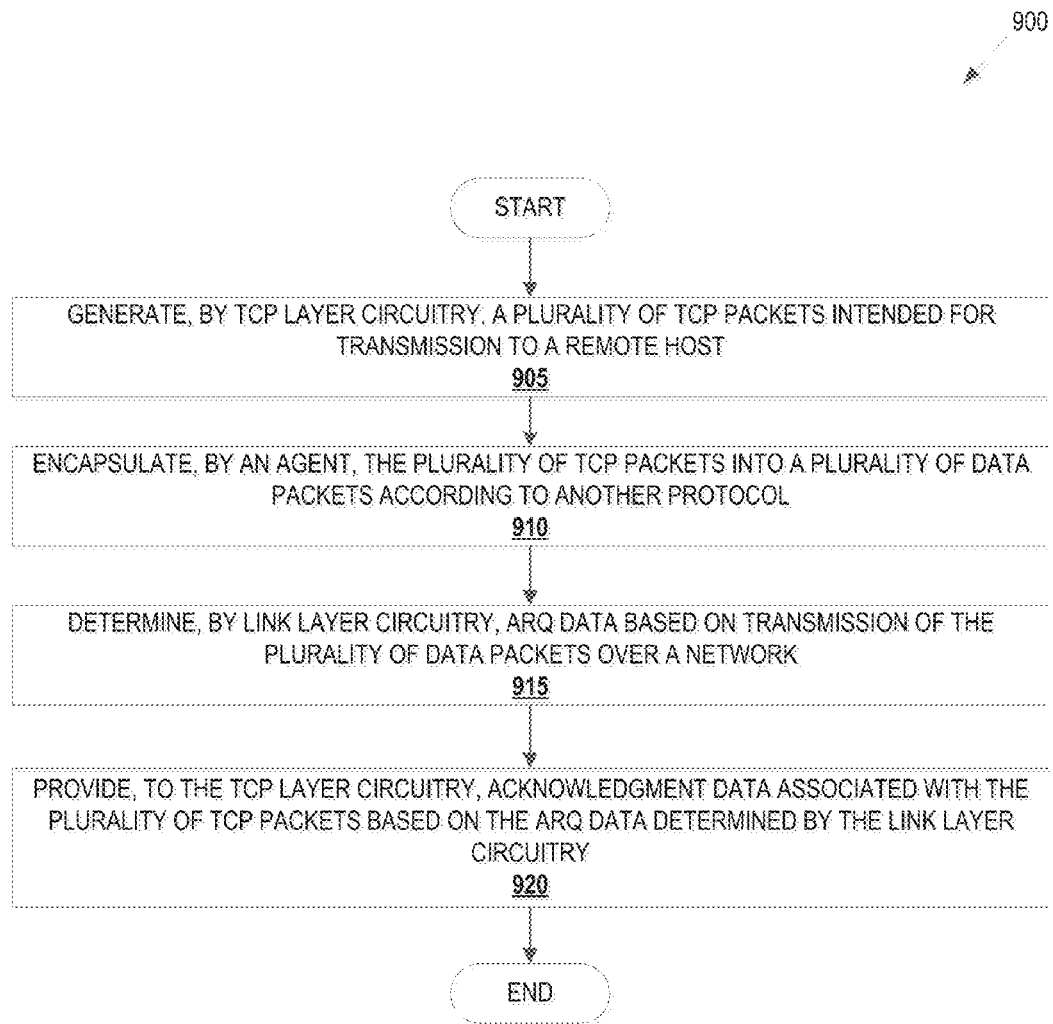
FIG. 9 is a flow diagram illustrating a method for providing acknowledgment data to TCP layer circuitry based on transmission of a plurality of data packets that encapsulate data from a plurality of TCP packets, in accordance with various embodiments.

Turning to FIG. 9, a flow diagram illustrates a method 900 for providing acknowledgment data to TCP layer circuitry based on transmission of a plurality of data packets that encapsulate data from a plurality of TCP packets, in accordance with various embodiments. The method 900 may be performed by a UE, such as the UE 110 of FIG. 1. While FIG. 9 illustrates a plurality of sequential operations, one of ordinary skill would understand that one or more operations of the method 900 may be transposed and/or performed contemporaneously.

To begin, the method 900 may include operation 905 for generating a plurality of TCP packets intended for transmission to a remote host. TCP layer circuitry may generate the plurality of TCP packets, for example, based on application data received from an application. The TCP layer circuitry may generate the plurality of TCP packets such that a header of a respective TCP packet includes a source port value associated with the application that provides the data from which the TCP packets are generated and a destination port value associated with a remote host (e.g., an end point or application executed at the remote host).

Operation 910 may include encapsulating data of the plurality of generated TCP packets into a plurality of data packets according to another protocol, such as a private protocol that may be tunneled in UDP. According to embodiments, an agent communicatively coupled with the TCP layer circuitry may intercept the plurality of TCP packets before the TCP packets are processed at lower layer circuitry (e.g., IP layer circuitry and/or link layer circuitry). For each TCP packet of the plurality, the agent may extract payload data, encapsulate the payload data in a data packet according to the other protocol, and discard the TCP header from the TCP packet. Prior to discarding the TCP header, however, the agent may identify a source port value and/or a destination port value. The agent may calculate a hash value based on at least one of the source port value and/or the destination port value and include the hash value in a header of the data packet in which the payload data is encapsulated. In various embodiments, the agent may encapsulate the data from the TCP packets into the plurality of data packets based at least in part on a compression algorithm, such as an SPDY algorithm to reduce traffic over a wireless radio network.

In embodiments, operation 910 may include operations associated with updating a mapping table. From each TCP header, a TCP sequence number may be identified. As a data packet encapsulating payload data from a TCP packet is provided to link layer circuitry (e.g., RLC sub-layer circuitry and/or MAC sub-layer circuitry), a PDU sequence number associated with that data packet may be mapped to the TCP sequence number of the TCP packet that originally included the payload data. For example, the agent may interact with PDCP layer circuitry to obtain a PDU sequence number associated with the data packet at the link layer circuitry, which the agent may then map to the original TCP sequence number. From the link layer circuitry, the plurality of data packets may reach physical layer circuitry, which may transmit the plurality of data packets to a network node over a radio network.

At operation 915, the method 900 may include determining ARQ data based on transmission of the plurality of data packets to the network node. Link layer circuitry (e.g., RLC sub-layer circuitry and/or MAC sub-layer circuitry) may perform at least part of this operation 915. From the link layer circuitry, the plurality of data packets may be transmitted to the network node over the radio network and, based on the transmission of the plurality of data packets, the link layer circuitry may receive ARQ data. For each data packet of the plurality, the link layer circuitry may receive an acknowledgment message from the network node that indicates the data packet was correctly received at the network node and, if no acknowledgment message is received, then the link layer circuitry may cause the unacknowledged data packet to be retransmitted until the acknowledgment is received or a predefined number of retransmissions is exceeded.

According to embodiments, the ARQ data may be ARQ data from RLC sub-layer circuitry of the link layer circuitry or HARQ data from the MAC sub-layer circuitry of the link layer circuitry. If the RLC sub-layer circuitry is operating in AM mode, then the RLC sub-layer circuitry may communicate the ARQ data to the agent, for example, directly or through PDCP circuitry. If the RLC sub-layer circuitry is operating in UM mode, then the MAC sub-layer circuitry may communicate HARQ data to the agent.

Subsequently, operation 920 may comprise providing, to the TCP layer circuitry, acknowledgment data associated with the plurality of TCP packets based on the ARQ data from the link layer circuitry. According to embodiments, the link layer circuitry may communicate, to the agent, ARQ data that indicates whether each data packet of the plurality is received at the network node. For each data packet of the plurality, the agent may access a lookup table with the PDU sequence number of the data packet to determine a corresponding TCP sequence number. To indicate that the payload data from the TCP packet originally associated with that TCP sequence number has been successfully transmitted to the network node, the agent may generate a TCP ACK for that TCP sequence number. A source port value and a destination port value may similarly be determined based on a lookup table and inserted into the TCP ACK. The generated TCP ACK may then be provided to the TCP layer circuitry. If the ARQ data does not indicate that a data packet has been received at the network node (e.g., the link layer circuitry determines that a predefined number of retransmissions for a data packet is exceeded), the TCP layer circuitry may provide a duplicate TCP packet to be retransmitted as described in the aforementioned operations 910-920.

Figure 10:
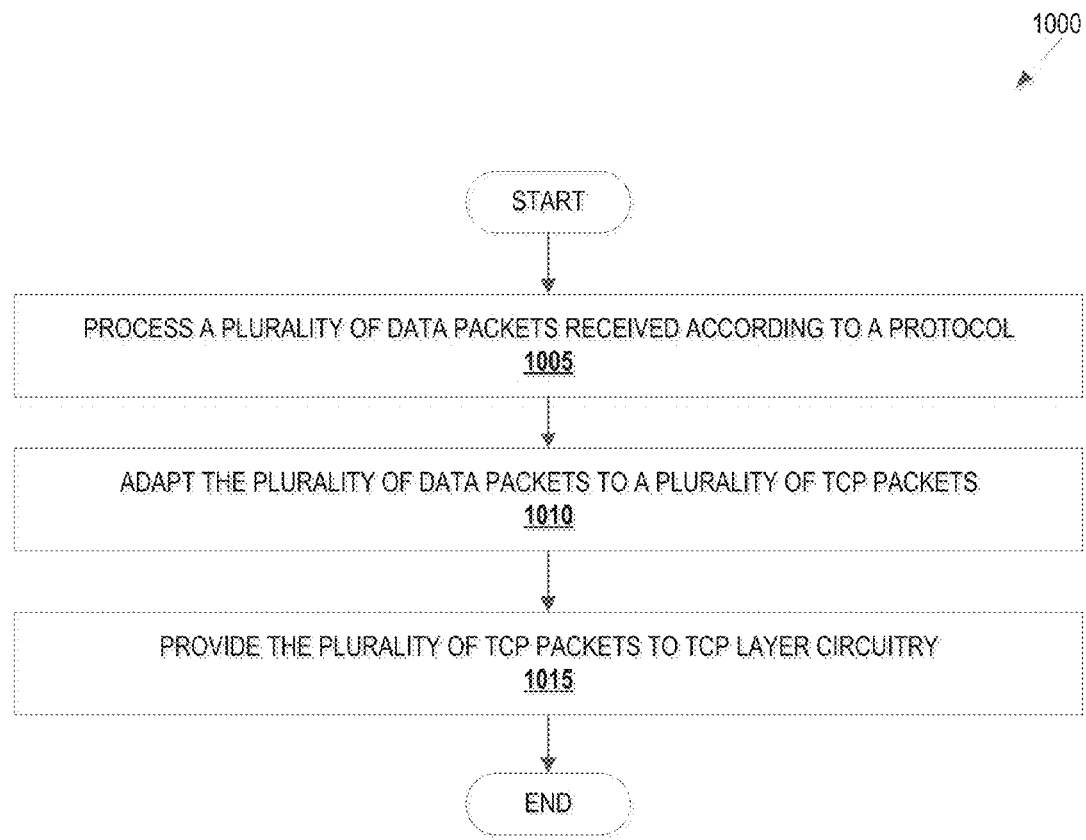
FIG. 10 is a flow diagram illustrating a method for providing data to TCP layer circuitry based on reception of a plurality of data packets according to another protocol, in accordance with various embodiments.

With respect to FIG. 10, a flow diagram illustrates a method 1000 for providing data to TCP layer circuitry based on reception of a plurality of data packets according to another protocol, in accordance with various embodiments. The method 1000 may be performed by a UE, such as the UE 110 of FIG. 1. While FIG. 10 illustrates a plurality of sequential operations, one of ordinary skill would understand that one or more operations of the method 1000 may be transposed and/or performed contemporaneously.

To begin, the method 1000 may include operation 1005 for processing a plurality of data packets received according to a protocol that is not TCP. The data packets may be received over a radio network from a network node and may be, for example, processed according to a private protocol that is tunneled in UDP. In response to receiving the plurality of data packets, link layer circuitry may transmit ARQ data to the network node.

Operation 1010 may comprise adapting the plurality of data packets to a plurality of TCP packets. In various embodiments, an agent may encapsulate payload data from a respective data packet into a TCP packet. For each data packet, the agent may identify at least one hash value from a header of the data packet. The agent may determine at least one port value (e.g., a destination port value and/or a source port value) based on the hash value—e.g., the agent may access a lookup table and determine the source port value and the destination port value based on the identified hash value. The agent may then insert the at least one port value into a header of the TCP packet.

Subsequently, operation 1015 may include providing the plurality of TCP packets to TCP layer circuitry. In various embodiments, this operation 1015 may be performed by the agent. The TCP layer circuitry may communicate the payload data from the generated TCP packets based on the port values included in the TCP headers of the TCP packets— e.g., the TCP layer circuitry may communicate payload data to an application.

Figure 11:
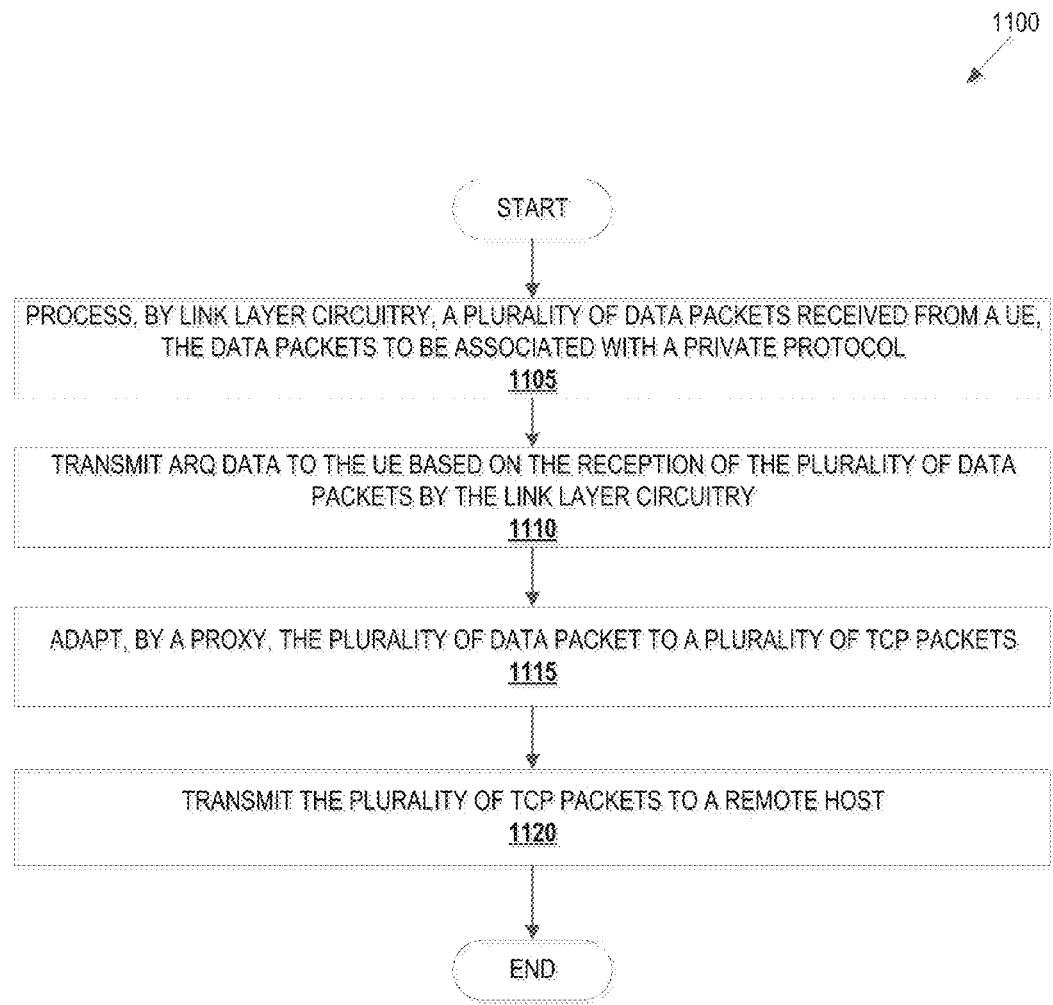
FIG. 11 is a flow diagram illustrating a method for providing data, received according to a private protocol, to a remote host according to TCP, in accordance with various embodiments.

In reference to FIG. 11, a flow diagram illustrates a method 1100 for providing data, received according to a private protocol, to a remote host according to TCP, in accordance with various embodiments. The method 1100 may be performed by a network node, such as the network node 120 of FIG. 1. While FIG. 11 illustrates a plurality of sequential operations, one of ordinary skill would understand that one or more operations of the method 1100 may be transposed and/or performed contemporaneously.

The method 1100 may begin with operation 1105 for processing a plurality of data packets associated with a private protocol and having data for a remote host. The plurality of data packets may be received from a UE and processed at link layer circuitry (e.g., RLC sub-layer circuitry and/or MAC sub-layer circuitry). Based on the reception of the plurality of data packets, operation 1110 may include transmitting ARQ data to the UE. For each data packet received and processed at the link layer circuitry, the link layer circuitry may transmit ARQ data that acknowledges that the data packet has been received. For example, RLC sub-layer circuitry may cause an ARQ acknowledgment message to be transmitted for each data packet, and/or MAC sub-layer circuitry may cause an HARQ acknowledgment message to be transmitted for each data packet.

At operation 1115, the method 1100 may include adapting the plurality of data packets to a plurality of TCP packets. In various embodiments, the link layer circuitry may cause the plurality of data packets to be provided to a proxy that is to perform the adaptation. According to embodiments, the proxy may be adapted to process data packets according to the private protocol, which may be tunneled in UDP. In various embodiments, the proxy may communicate with TCP layer circuitry to adapt the plurality of data packets to the plurality of TCP packets.

In various embodiments, operation 1115 may include operations associated with encapsulating payload data from a respective data packet into a TCP packet. For each data packet, the proxy may identify at least one hash value from a header of the data packet. The proxy may determine at least one port value (e.g., a destination port value and/or a source port value) based on the hash value—e.g., the proxy may access a lookup table and determine the source port value and the destination port value based on the identified hash value. The at least one port value may be inserted into a header of the TCP packet. In one embodiment, the proxy may adapt the plurality of data packets into the plurality of TCP packets. In another embodiment, the proxy may cause the plurality of data packets to be adapted to the plurality of TCP packets by providing the payload data and the at least one port value to the TCP layer circuitry, which may then perform packetization. In some embodiments, the payload data may be adapted from the data packets into the plurality of TCP packets based at least in part on restoration of the payload data based on a compression algorithm, such as an SPDY algorithm.

Subsequently, the method 1100 may include an operation 1120 for transmitting the plurality of TCP packets to the remote host. Through this approach, the TCP semantic may be maintained between the UE and the remote host while reducing TCP traffic across a radio network over which the UE and the network node are to communicate. In various embodiments, the TCP packets may be transmitted to the remote host over the Internet by TCP layer circuitry communicatively coupled with IP layer circuitry. In some embodiments, the payload data from the plurality of data packets may be cached, either before or after TCP packetization, so that if a TCP ACK is not received from the remote host for a TCP packet, then that TCP packet may be retransmitted without requiring retransmission from the UE.

Figure 12:
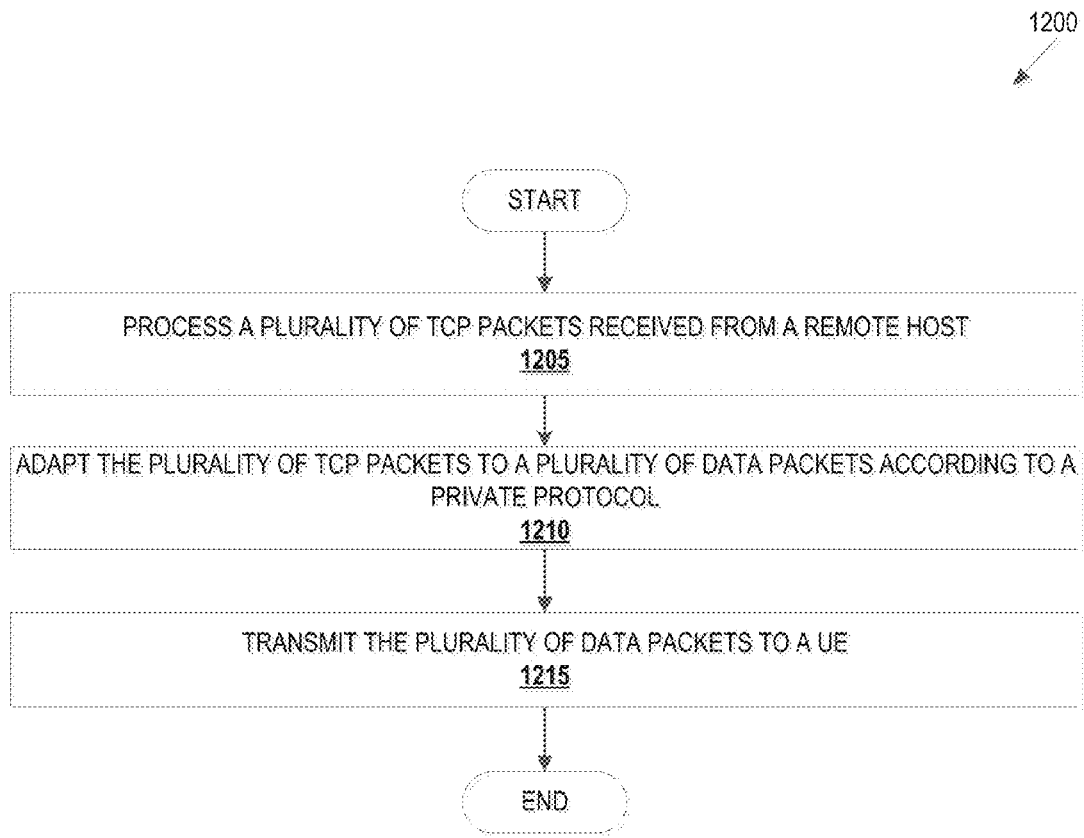
FIG. 12 is a flow diagram illustrating a method for transmitting, to a user equipment, a plurality of data packets adapted from TCP to another protocol, in accordance with various embodiments.

With respect to FIG. 12, a flow diagram illustrates a method 1200 for transmitting, to a UE, a plurality of data packets adapted from TCP to another protocol, in accordance with various embodiments. The method 1200 may be performed by a network node, such as the network node 120 of FIG. 1. While FIG. 12 illustrates a plurality of sequential operations, one of ordinary skill would understand that one or more operations of the method 1200 may be transposed and/or performed contemporaneously.

The method 1200 may begin with an operation 1205 for processing a plurality of TCP packets received from a remote host. The TCP packets may be received over the Internet at TCP circuitry. The TCP packets may be intended for an endpoint (e.g., an application) executed by a UE that operates on a cell, such as a cell provided by the network node or a cell provided by an access node communicatively coupled with the network node.

Operation 1210 may comprise adapting the plurality of TCP packets to a plurality of data packets according to another protocol. In various embodiments, a proxy may encapsulate payload data from a respective TCP packet into a data packet. For each TCP packet, the proxy may identify at least one port value (e.g., a destination port value and/or a source port value) from the header of the TCP packet. At least one hash value may be determined from the at least one port value. The at least one hash value may be determined, for example, by applying a predetermined hash function to the at least one port value (e.g., a destination port value and/or a source port value) or by accessing a lookup table with the at least one port value to determine the hash value. The determined hash value may then be inserted into a header of a data packet, with the payload data of the TCP packet inserted into the payload of the data packet.

Subsequently, operation 1215 may include transmitting the plurality of data packets to the UE. In various embodiments, the proxy may provide the plurality of data packets to lower layer circuitry (e.g., link layer circuitry and physical layer circuitry) for transmission over a radio network to the UE. The TCP layer circuitry may communicate the payload data from the generated TCP packets based on the port values included in the TCP headers of the TCP packets—e.g., the TCP layer circuitry may communicate payload data to an application.

In various embodiments, example 1 may be an apparatus to be included in a user equipment ("UE"), the apparatus comprising: TCP layer circuitry to generate a plurality of TCP packets intended for transmission to a remote host; an agent, coupled with the TCP layer circuitry, to intercept the plurality of TCP packets, to encapsulate data from the plurality of TCP packets into a plurality of data packets according to another protocol, and to provide acknowledgment data to the TCP layer circuitry based on Automatic Repeat Request ("ARQ") data that is based on transmission of the plurality of data packets; and link layer circuitry, coupled with the agent, to determine the ARQ data based on the transmission of the plurality of data packets over a network. Example 2 may be apparatus of example 1, wherein the plurality of data packets are to be included in a plurality of Uniform Datagram Protocol ("UDP") datagrams. Example 3 may be the apparatus of example 1, further comprising: physical layer circuitry, coupled with the link layer circuitry, to transmit the data packets over the network to a network node. Example 4 may be the apparatus of example 1, wherein the link layer circuitry comprises: RLC sub-layer circuitry; and MAC sub-layer circuitry. Example 5 may be the apparatus of example 4, wherein the agent is further to map a respective TCP sequence number associated with a respective TCP packet of the plurality of TCP packets to a protocol data unit ("PDU") sequence number associated with the RLC sub-layer circuitry or the MAC sub-layer circuitry, and further wherein the agent is to provide acknowledgment data for the respective TCP packet based on ARQ data associated with the PDU sequence number mapped to the respective TCP sequence number. Example 6 may be the apparatus of example 4, wherein the agent is to provide acknowledgment data to the TCP layer circuitry based on ARQ data by generation, at the UE, of a TCP acknowledgment ("ACK") corresponding to at least one TCP packet of the plurality of TCP packets based on ARQ data, associated with transmission of a data packet, received from the RLC sub-layer circuitry or hybrid ARQ ("HARQ") data received from the MAC sub-layer. Example 7 may be the apparatus of any of examples 1-6, wherein the TCP layer circuitry is to: receive application data from an application for the transmission to the remote host; and generate the plurality of TCP packets based on the application data. Example 8 may be the apparatus of example 7, wherein a respective TCP packet of the plurality of TCP packets is to include a source port value and a destination port value, and further wherein the agent is to calculate a hash value based on the source port value and the destination port value to identify the application at the UE and include the hash value in a header of a respective data packet of the plurality of data packets. Example 9 may be the apparatus of any of examples 1-6, wherein the agent is to encapsulate the data from the plurality of TCP packets into the plurality of data packets according to the other protocol based at least in part on a compression algorithm. Example 10 may be the apparatus of any of examples 1-6, wherein the agent is to process a second plurality of data packets that are received according to the other protocol, to adapt the second plurality of processed data packets to a second plurality of TCP packets, and to provide the second plurality of TCP packets to the TCP layer circuitry.

In various embodiments, example 11 may be an apparatus to be included in a network node, the apparatus comprising: a proxy to process a plurality of received data packets having data for a remote host according to a private protocol and to adapt, or cause to be adapted, the plurality of data packets to a plurality of Transmission Control Protocol ("TCP") packets; link layer circuitry, coupled to the proxy, to provide Automatic Repeat Request ("ARQ") data to a user equipment ("UE") based on the reception of the plurality of data packets; and TCP layer circuitry, coupled with the proxy, to provide the plurality of TCP packets to the remote host.

Example 12 may be the apparatus of example 11, wherein the private protocol is tunneled in a user datagram protocol ("UDP") and the plurality of received data packets is included in a plurality of UDP datagrams. Example 13 may be the apparatus of example 11, wherein the link layer circuitry comprises: a Radio Link Control ("RLC") sublayer circuitry; and a Media Access Control ("MAC") sublayer circuitry. Example 14 may be the apparatus of example 11, wherein the proxy is to adapt a respective data packet to a respective TCP packet based on extraction of a hash value in a header of the respective data packet, identification of a source port value and a destination port value based on the extracted hash value, and insertion of the source port value and the destination port value into a header of the respective TCP packet. Example 15 may be the apparatus of example 14, wherein the proxy is further to cause a mapping table to be transmitted to another network node based on a handover of the UE to the other network node, the mapping table to map the hash value to the source port value and the destination port value. Example 16 may be the apparatus of any of examples 11-15, wherein the proxy is to cache data associated with the plurality of TCP packets, to process acknowledgment data associated with the plurality of TCP packets from the remote host, and to cause retransmission of a respective TCP packet if acknowledgment data corresponding to the respective TCP packet is not processed. Example 17 may the apparatus of any of examples 11-15, wherein the proxy is to adapt the plurality of data packets to the plurality of TCP packets based on restoration of data included in the plurality of data packets according to a compression algorithm. Example 18 may be the apparatus of any of examples 11-15, wherein the proxy is to process a plurality of TCP packets, received from the remote host, to adapt the plurality of received TCP packets to a second plurality of data packets according to the private protocol, and to provide the second plurality of data packets to physical layer circuitry for transmission to the UE, and the apparatus further comprising: the physical layer circuitry, coupled with the link layer circuitry, to transmit the second plurality of data packets to the UE. Example 19 may be the apparatus of example 18, wherein the proxy is adapt a respective TCP packet of the plurality of received TCP packets to a respective data packet of the second plurality of data packets by extraction of a source port value and a destination port value from a header of the TCP packet, calculation of a hash value based on the source port value and the destination port value, and insertion of the calculated hash value into a header of the respective data packet. Example 20 may be the apparatus of any of examples 11-15, wherein the network node is an access node adapted to provide a cell on which the UE is to operate, a serving gateway, or a packet data network gateway.

In various embodiments, example 21 may be one or more non-transitory computer system-readable media comprising computing device-executable instructions, wherein the instructions, in response to execution by a computing device, cause the computing device to: generate a plurality of Transmission Control Protocol ("TCP") packets intended for transmission to a remote host; encapsulate, by an agent, data associated with the plurality of TCP packets into a plurality of data packets according to a private protocol; determine Automatic Repeat Request ("ARQ") data based on transmission of the plurality of data packets over a network; and generate acknowledgment data associated with the plurality of TCP packets based on the ARQ data determined by the link layer circuitry. Example 22 may be the one or more non-transitory computer system-readable media of example 21, wherein the private protocol is tunneled in a user datagram protocol ("UDP"). Example 23 may be the one or more non-transitory computer system-readable media of any of examples 21-22, wherein the instructions further cause the computing device to map a respective TCP sequence number associated with a respective TCP packet of the plurality of TCP packets to a protocol data unit ("PDU") sequence number associated with a Radio Link Control ("RLC") layer or Media Access Control ("MAC") layer.

In various embodiments, example 24 may be one or more non-transitory computer system-readable media comprising computing device-executable instructions, wherein the instructions, in response to execution by a computing device, cause the computing device to: process a plurality of data packets received from a user equipment ("UE"), the plurality of received data packets to be associated with a private protocol and to have data for a remote host; transmit Automatic Repeat Request ("ARQ") data to a user equipment ("UE") based on the reception of the plurality of data packets; adapt, by a proxy, the plurality of data packets to a plurality of Transmission Control Protocol ("TCP") packets; and transmit the plurality of TCP packets to the remote host. Example 25 may be the one or more non-transitory computer system-readable media comprising computing device-executable instructions of example 24, wherein the adaptation, by the proxy, of the plurality of data packets to the plurality of TCP packets comprises instructions to: restore data from the plurality of received data packets according to a compression algorithm; extract a respective hash value from a respective header of a respective received data packet; identify a respective source port value and a respective destination port value based on the extracted hash value; and insert the restored data, the respective source port value, and the respective destination port value into a respective header of a respective TCP packet of the plurality of TCP packets.

In various embodiments, example 26 may be a method to be performed by a user equipment ("UE"), the method comprising: generating a plurality of Transmission Control Protocol ("TCP") packets intended for transmission to a remote host; encapsulating data from the plurality of TCP packets into a plurality of data packets according to another protocol; transmitting the plurality of data packets over a network; receiving Automatic Repeat Request ("ARQ") data based on the transmitting of the plurality of data packets; and locally generating TCP acknowledgement data based on the receiving of the ARQ data. Example 27 may be the method of example 26, wherein the plurality of data packets is to be included in a plurality of Uniform Datagram Protocol ("UDP") datagrams. Example 28 may be the method of example 26, further comprising: mapping a respective TCP sequence number associated with a respective TCP packet of the plurality of TCP packets to a protocol data unit ("PDU") sequence number associated with an RLC layer or an MAC layer. Example 29 may be the method of example 28, wherein the ARQ data comprises ARQ acknowledgment data associated with the RLC layer or hybrid ARQ ("HARQ") acknowledgment data associated with the MAC layer. Example 30 may be the method of any of examples 26-29, wherein plurality of TCP packets are generated based on application data from an application associated with the UE. Example 31 may be the method of any of examples 26-29, further comprising: calculating a hash value based on a source port value and a destination port value included in a header of a first TCP packet of the plurality of TCP packets; and including the hash value in a header of a first data packet of the plurality of data packets. Example 32 the method of any of examples 26-29, wherein the data from the plurality of TCP packets is to be encapsulated into the plurality of data packets according to the other protocol based at least in part on a compression algorithm. Example 33 may be the method of any of examples 26-29, further comprising: receiving a second plurality of data packets according to the other protocol; and adapting the second plurality of processed data packets to a second plurality of TCP packets.

In various embodiments, example 34 may be a method to be performed in a network node, the method comprising: receiving a plurality data packets having data for a remote host according to a private protocol; adapting, or causing to be adapted, the plurality of data packets to a plurality of Transmission Control Protocol ("TCP") packets; transmitting Automatic Repeat Request ("ARQ") data to a user equipment ("UE") based on the receiving of the plurality of data packets; and transmitting the plurality of TCP packets to the remote host. Example 35 may be the method of example 34, wherein the private protocol is tunneled in a user datagram protocol ("UDP") and the plurality of received data packets is included in a plurality of UDP datagrams. Example 36 may be the method of example 34, wherein the adapting, or causing to be adapted, of the plurality of data packets to the plurality of TCP packets comprises: extracting, from a respective data packet, a hash value; identifying a source port value and a destination port value based on the extracted hash value; and inserting the source port value and the destination port value into a header of the respective TCP packet. Example 37 may be the method of example 36, further comprising: transmitting a mapping table to another network node based on a handover of the UE to the other network node, the mapping table to map the hash value to the source port value and the destination port value. Example 38 may be the method of any of examples 34-37, further comprising: caching data associated with the plurality of TCP packets; and retransmitting a respective TCP packet of the plurality of TCP packets to the remote host if acknowledgment data corresponding to the respective TCP packet is not received. Example 39 may be the method of any of examples 34-37, further comprising: processing a plurality of TCP packets received from the remote host; adapting the plurality of received TCP packets to a second plurality of data packets according to the private protocol; and transmitting the second plurality of data packets to the UE. Example 40 may be the method of example 39, the method further comprising: extracting a source port value and a destination port value from a header of a respective TCP packet of the plurality of TCP packets received from the remote host; calculating a hash value based on the source port value and the destination port value; and inserting the calculated hash value into a header of a respective data packet of the second plurality of data packets.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An apparatus to be included in a user equipment ("UE"), the apparatus comprising:
   Transmission Control Protocol ("TCP") layer circuitry to generate a plurality of TCP packets intended for transmission to a remote host;
   an agent circuitry, coupled with the TCP layer circuitry, to intercept the plurality of TCP packets, to encapsulate data from the plurality of TCP packets into a plurality of data packets according to another protocol, and to provide acknowledgment data to the TCP layer circuitry based on Automatic Repeat Request ("ARQ") data that is based on transmission of the plurality of data packets; and
   link layer circuitry, coupled with the agent circuitry, to determine the ARQ data based on the transmission of the plurality of data packets over a network.

2. The apparatus of claim 1, wherein the plurality of data packets are to be included in a plurality of Uniform Datagram Protocol ("UDP") datagrams.

3. The apparatus of claim 1, further comprising:
physical layer circuitry, coupled with the link layer circuitry, to transmit the data packets over the network to a network node.

4. The apparatus of claim 1, wherein the link layer circuitry comprises:
Radio Link Control ("RLC") sub-layer circuitry; and
Media Access Control ("MAC") sub-layer circuitry.

5. The apparatus of claim 4, wherein the agent circuitry is further to map a respective TCP sequence number associated with a respective TCP packet of the plurality of TCP packets to a protocol data unit ("PDU") sequence number associated with the RLC sub-layer circuitry or the MAC sub-layer circuitry, and further wherein the agent circuitry is to provide acknowledgment data for the respective TCP packet based on ARQ data associated with the PDU sequence number mapped to the respective TCP sequence number.

6. The apparatus of claim 4, wherein the agent circuitry is to provide acknowledgment data to the TCP layer circuitry based on ARQ data by generation, at the UE, of a TCP acknowledgment ("ACK") corresponding to at least one TCP packet of the plurality of TCP packets based on ARQ data, associated with transmission of a data packet, received from the RLC sub-layer circuitry or hybrid ARQ ("HARQ") data received from the MAC sub-layer circuitry.

7. The apparatus of claim 1, wherein the TCP layer circuitry is to:
receive application data from an application for the transmission to the remote host; and
generate the plurality of TCP packets based on the application data.

8. The apparatus of claim 7, wherein a respective TCP packet of the plurality of TCP packets is to include a source port value and a destination port value, and further wherein the agent circuitry is to calculate a hash value based on the source port value and the destination port value to identify the application at the UE and include the hash value in a header of a respective data packet of the plurality of data packets.

9. The apparatus of claim 1, wherein the agent circuitry is to encapsulate the data from the plurality of TCP packets into the plurality of data packets according to the another protocol based at least in part on a compression algorithm.

10. The apparatus of claim 1, wherein the agent circuitry is to process a second plurality of data packets that are received according to the another protocol, to adapt the second plurality of processed data packets to a second plurality of TCP packets, and to provide the second plurality of TCP packets to the TCP layer circuitry.

11. An apparatus to be included in a network node, the apparatus comprising:
a proxy circuitry to process a plurality of received data packets having data for a remote host according to a private protocol and to adapt, or cause to be adapted, the plurality of data packets to a plurality of Transmission Control Protocol ("TCP") packets;
link layer circuitry, coupled to the proxy circuitry, to provide Automatic Repeat Request ("ARQ") data to a user equipment ("UE") based on the plurality of received data packets from the UE according to the private protocol; and
TCP layer circuitry, coupled with the proxy circuitry, to provide the plurality of TCP packets to the remote host.

12. The apparatus of claim 11, wherein the private protocol is tunneled in a user datagram protocol ("UDP") and the plurality of received data packets is included in a plurality of UDP datagrams.

13. The apparatus of claim 11, wherein the link layer circuitry comprises:
a Radio Link Control ("RLC") sub-layer circuitry; and
a Media Access Control ("MAC") sub-layer circuitry.

14. The apparatus of claim 11, wherein the proxy circuitry is to adapt a respective data packet to a respective TCP packet based on extraction of a hash value in a header of the respective data packet, identification of a source port value and a destination port value based on the extracted hash value, and insertion of the source port value and the destination port value into a header of the respective TCP packet.

15. The apparatus of claim 14, wherein the proxy circuitry is further to cause a mapping table to be transmitted to another network node based on a handover of the UE to the another network node, the mapping table to map the hash value to the source port value and the destination port value.

16. The apparatus of claim 11, wherein the proxy circuitry is to cache data associated with the plurality of TCP packets, to process acknowledgment data associated with the plurality of TCP packets from the remote host, and to cause retransmission of a respective TCP packet if acknowledgment data corresponding to the respective TCP packet is not processed.

17. The apparatus of claim 11, wherein the proxy circuitry is to adapt the plurality of data packets to the plurality of TCP packets based on restoration of data included in the plurality of data packets according to a compression algorithm.

18. The apparatus of claim 11, wherein the proxy circuitry is to process a plurality of TCP packets, received from the remote host, to adapt the plurality of received TCP packets to a second plurality of data packets according to the private protocol, and to provide the second plurality of data packets to physical layer circuitry for transmission to the UE, and the apparatus further comprising:
the physical layer circuitry, coupled with the link layer circuitry, to transmit the second plurality of data packets to the UE.

19. The apparatus of claim 18, wherein the proxy circuitry is to adapt a respective TCP packet of the plurality of received TCP packets to a respective data packet of the second plurality of data packets by extraction of a source port value and a destination port value from a header of the respective TCP packet, calculation of a hash value based on the source port value and the destination port value, and insertion of the calculated hash value into a header of the respective data packet.

20. The apparatus of claim 11, wherein the network node is an access node adapted to provide a cell on which the UE is to operate, a serving gateway, or a packet data network gateway.

21. One or more non-transitory computer system-readable media comprising computing device-executable instructions, wherein the instructions, in response to execution by a computing device, cause the computing device to:
generate, by a Transmission Control Protocol ("TCP") layer circuitry of the computing device, a plurality of Transmission Control Protocol ("TCP") packets intended for transmission to a remote host;
encapsulate, by an agent circuitry of the computing device, data associated with the plurality of TCP packets into a plurality of data packets according to a private protocol;
determine Automatic Repeat Request ("ARQ") data based on transmission of the plurality of data packets over a network according to the private protocol; and generate acknowledgment data associated with the plurality of TCP packets based on the ARQ data determined by a link layer circuitry.

22. The one or more non-transitory computer system-readable media of claim 21, wherein the private protocol is tunneled in a user datagram protocol ("UDP").

23. The one or more non-transitory computer system-readable media of claim 21, wherein the instructions further cause the computing device to map a respective TCP sequence number associated with a respective TCP packet of the plurality of TCP packets to a protocol data unit ("PDU") sequence number associated with a Radio Link Control ("RLC") layer or Media Access Control ("MAC") layer.

24. One or more non-transitory computer system-readable media comprising computing device-executable instructions, wherein the instructions, in response to execution by a computing device, cause the computing device to:

process a plurality of data packets received from a user equipment ("UE"), the plurality of received data packets to be associated with a private protocol and to have data for a remote host;

transmit Automatic Repeat Request ("ARQ") data to a user equipment ("UE") based on the plurality of received data packets from the UE according to the private protocol;

adapt, by a proxy circuitry, the plurality of data packets to a plurality of Transmission Control Protocol ("TCP") packets; and transmit the plurality of TCP packets to the remote host.

25. The one or more non-transitory computer system-readable media comprising computing device-executable instructions of claim 24, wherein the adaptation, by the proxy circuitry, of the plurality of data packets to the plurality of TCP packets comprises instructions to:

restore data from the plurality of received data packets according to a compression algorithm;

extract a respective hash value from a respective header of a respective received data packet;

identify a respective source port value and a respective destination port value based on the extracted hash value; and insert the restored data, the respective source port value, and the respective destination port value into a respective header of a respective TCP packet of the plurality of TCP packets.

* * * * *